(12) United States Patent
Kusukame et al.

(10) Patent No.: US 8,144,391 B2
(45) Date of Patent: Mar. 27, 2012

(54) WAVELENGTH CONVERTER, IMAGE DISPLAY AND MACHINING APPARATUS

(75) Inventors: Koichi Kusukame, Osaka (JP);
Kiminori Mizuuchi, Ehime (JP);
Kazuhisa Yamamoto, Osaka (JP);
Hiroyuki Furuya, Osaka (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 12/676,042

(22) PCT Filed: Aug. 27, 2008

(86) PCT No.: PCT/JP2008/002326
§ 371 (c)(1),
(2), (4) Date: Mar. 2, 2010

(87) PCT Pub. No.: WO2009/031278
PCT Pub. Date: Mar. 12, 2009

(65) Prior Publication Data
US 2010/0195191 A1  Aug. 5, 2010

(30) Foreign Application Priority Data

Sep. 3, 2007 (JP) .................................. 2007-228364
Jan. 18, 2008 (JP) .................................. 2008-009789

(51) Int. Cl.
*G02F 2/02* (2006.01)
*H01S 3/04* (2006.01)
*H01S 3/10* (2006.01)

(52) U.S. Cl. ............. 359/328; 372/22; 372/34; 359/332

(58) Field of Classification Search .......... 359/326–332; 372/21, 22, 34, 36
See application file for complete search history.

(56) References Cited

U.S. PATENT DOCUMENTS
6,624,923 B2 * 9/2003 Furukawa et al. ............ 359/326
(Continued)

FOREIGN PATENT DOCUMENTS
JP          5-97591          4/1993
(Continued)

OTHER PUBLICATIONS
International Search Report issued Oct. 21, 2008 in International (PCT) Application No. PCT/JP2008/002326.
(Continued)

*Primary Examiner* — Daniel Petkovsek
(74) *Attorney, Agent, or Firm* — Wenderoth, Lind & Ponack, L.L.P.

(57) ABSTRACT

A wavelength converter is provided with an infrared light source (1) for emitting a fundamental wave having a wavelength of 2000 nm or shorter, a wavelength conversion element (3) composed of a nonlinear optical crystal having a periodical polarization reversal structure and adapted to convert a fundamental wave emitted from the infrared light source (1) into a harmonic wave, and a heater (4) for heating the wavelength conversion element (3). The period of the polarization reversal structure is designed so that a quasi phase matching temperature of the fundamental wave and the harmonic wave is 40° C. or higher. The heater (4) heats the wavelength conversion element (3) to a temperature at which quasi phase matching is established, and the nonlinear optical crystal contains a lithium niobate or lithium tantalate including at least any one of additives Mg, In, Zn and Sc as a main component. Thus, optical damage can be suppressed and visible light absorption attributed to ultraviolet light can be reduced.

23 Claims, 18 Drawing Sheets

U.S. PATENT DOCUMENTS

| | | | |
|---|---|---|---|
| 6,673,330 B1 * | 1/2004 | Kitamura et al. | 423/594.8 |
| 6,714,569 B2 | 3/2004 | Zhu et al. | |
| 7,112,263 B2 * | 9/2006 | Nihei | 204/164 |
| 7,692,848 B2 * | 4/2010 | Furuya et al. | 359/328 |
| 7,999,998 B2 * | 8/2011 | Morikawa et al. | 359/328 |
| 2005/0190805 A1 * | 9/2005 | Scripsick et al. | 372/41 |
| 2009/0027764 A1 | 1/2009 | Furuya et al. | |
| 2009/0046749 A1 | 2/2009 | Mizuuchi | |

FOREIGN PATENT DOCUMENTS

| | | |
|---|---|---|
| JP | 5-323406 | 12/1993 |
| JP | 6-283793 | 10/1994 |
| JP | 8-304863 | 11/1996 |
| JP | 2000-338532 | 12/2000 |
| JP | 2001264554 A * | 9/2001 |
| JP | 2004-70207 | 3/2004 |
| JP | 2006-308731 | 11/2006 |
| JP | 2007-156438 | 6/2007 |
| WO | 2006/013890 | 2/2006 |
| WO | 2006/104051 | 10/2006 |

OTHER PUBLICATIONS

D.H. Jundt et al., "Periodically poled $LiNbO_3$ for high-efficiency second-harmonic generation", Applied Optics, Nov. 18, 1991, vol. 59, No. 21, pp. 2657-2659.

T. Hatanaka et al., "Quasi-phase-matched optical parametric oscillation with periodically poled stoichiometric $LiTaO_3$", Optics Letters, May 1, 2000, vol. 25, No. 9, pp. 651-653.

D.A. Bryan et al. "Increased optical damage resistance in lithium niobate", Applied Physics letters, 44(9), 1984, pp. 847-849.

* cited by examiner

WAVELENGTH CONVERTER, IMAGE DISPLAY AND MACHINING APPARATUS

TECHNOLOGICAL FIELD

The present invention relates to a wavelength converter for converting a fundamental wave into a harmonic wave, an image display including the wavelength converter and a machining apparatus including the wavelength converter.

BACKGROUND ART

Attention has been attracted to high-output laser light sources with an output exceeding several W as light sources used for processing application or used in laser displays. Semiconductor lasers using gallium arsenide, gallium nitride and the like have been developed for the generation of light in a red or blue region, and higher outputs are also being studied. However, it is still difficult to directly generate light in a green region from a semiconductor laser. Thus, a general method is such that infrared light emitted from a solid-state laser such as a YAG laser or a fiber laser using a fiber doped with a rare earth such as Yb or Nd is incident as a fundamental wave on a nonlinear optical crystal to obtain green light as a second harmonic wave by a wavelength conversion.

Particularly, a quasi phase matching wavelength conversion element formed using a polarization reversal technology is so constructed as to enable the generation of high-output short-wavelength light in a nonlinear optical crystal composed of $LiNbO_3$ (hereinafter, "LN") or $LiTaO_3$ (hereinafter, "LT"). In the LN or LT nonlinear optical crystal composed of LN or LT, optical damage at the time of generating short-wavelength light has been a problem. This is a phenomenon of changing a refractive index by an electric field distribution formed in the crystal by the short-wavelength light and can be reduced by adding a necessary amount of Mg, In, Zn, Sc or the like in the LN or LT nonlinear optical crystal. On the other hand, it is known that optical damage can be reduced to a certain degree by keeping crystals at a high temperature of 100° C. or higher in non-doped crystals not added with these additives.

In other words, the LN or LT nonlinear optical crystal has been known to be able to reduce an output variation caused by optical damage by using a non-doped crystal at a high temperature or adding an additive. For example, non-patent literatures 1 and 2 disclose that optical damage can be suppressed by adding MgO in a molar concentration of 5.0 mol % or more.

On the other hand, even in crystals with suppressed optical damage, output instability for short-wavelength light with an output exceeding several W and a phenomenon of causing a crystal destruction have been found. For example, as disclosed in patent literature 1, green light absorption is induced by ultraviolet light (third harmonic wave) generated as a sum frequency of infrared light as a fundamental wave and converted green light (second harmonic wave) and the crystal destruction occurs due to green light absorption at the time of a high-output wavelength conversion. In this case, a wavelength conversion exceeding several W becomes difficult.

In order to provide a light source for generating green light with an output exceeding several W necessary for medical, machining or laser display use, a nonlinear optical crystal which has less absorption of green light induced by ultraviolet light and does not cause optical damage is strongly required.

In the conventional construction, output instability caused by optical damage is solved in the LN or LT nonlinear optical crystal including the additive such as Mg, In, Zn or Sc. However, in the generation of short-wavelength light with an output exceeding several W, output instability and phenomena such as crystal destruction resulting from a thermal lens effect by light absorption are not solved and there has been a problem of being difficult to obtain a higher output from a nonlinear optical crystal including an additive.

Specifically, in the case of obtaining a harmonic wave of several W using a wavelength conversion element composed of MgLN (LN nonlinear optical crystal added with Mg), ultraviolet light (third harmonic wave) as a sum frequency of infrared light as a fundamental wave and converted green light (second harmonic wave) is generated due to a large nonlinear optical constant also in the case of deviation from a phase matching condition. This generated ultraviolet light induces the green light absorption to create a thermal lens. This has caused a problem of inducing the beam deterioration of the green light and a problem of inducing a reduction in conversion efficiency at the time of a high output and the thermal destruction of the crystal by generated heat.

Although it depends on the element, crystal destruction starts upon generating an output exceeding 2.5 W in the case of generating green light. In the case of generating blue light having a shorter wavelength than green light, it is known that a threshold value of the crystal destruction is reduced and the crystal destruction starts when an average output of continuous light exceeds an output of 2 W. In the case of pulse oscillation with a high peak value, the crystal destruction occurs when an average output exceeds 0.5 W.

There has been a method for suppressing optical damage by increasing a crystal temperature in a non-doped LN or LT nonlinear optical crystal having a conventional structure. However, a reduction of optical damage by an operation at a high temperature requires a high temperature of 100° C. or higher and the realization of a high output characteristic requires a high temperature of 140° C. or higher. Further, it is difficult to completely reduce optical damage even in the case of an operation at a high temperature. Particularly, in the generation of short-wavelength light, there has been a problem that an output becomes unstable. In the operation at a high temperature of 140° C. or higher, there have been a problem of being difficult to maintain temperature uniformity, a problem of increasing power consumption and other problems. Further, since a temperature tolerance of the wavelength conversion element having a periodical polarization reversal structure becomes narrower as temperature rises, there have been a problem of necessitating a precise temperature control at high temperatures and a problem of being difficult to stabilize an output.

Patent Literature 1:
Japanese Unexamined Patent Publication No. 2006-308731

Non-Patent Literature 1:
D. A. Bryan, Robert Gerson, H. E. Tomaschke, "Increased Optical Damage Resistance in Lithium Niobate", Applied Physics letters, 44(9), 1984, pp. 847-849

Non-Patent Literature 2:
D. H. Jundt, G. A. Magel, M. M. Fejer, R. L. Byer, "Periodically Poled $LiNbO_3$ for High-Efficiency Second-Harmonic Generation", Applied Physics letters, 59(21), 1991, pp. 2657-2659

SUMMARY OF THE DISCLOSURE

The present invention was developed in order to solve the above problems, and an object thereof is to provide a wavelength converter, an image display and a machining apparatus capable of suppressing optical damage and reducing visible light absorption attributed to ultraviolet light.

One aspect of the present invention is directed to a wavelength converter, comprising a fundamental wave light source for emitting a fundamental wave having a wavelength of 2000 nm or shorter; a wavelength conversion element composed of a nonlinear optical crystal having a periodical polarization reversal structure and adapted to convert a fundamental wave emitted from the fundamental wave light source into a harmonic wave; and a heating unit for heating the wavelength conversion element, wherein the period of the polarization reversal structure is so designed that a quasi phase matching temperature of the fundamental wave and the harmonic wave is 40° C. or higher, the heating unit heats the wavelength conversion element to a temperature at which the quasi phase matching is established, and the nonlinear optical crystal contains a lithium niobate or lithium tantalate including at least any one of additives Mg, In, Zn and Sc as a main component.

According to this construction, in the nonlinear optical crystal containing the lithium niobate or lithium tantalate including at least any one of the additives Mg, In, Zn and Sc as the main component, the periodical polarization reversal structure is formed and a wavelength conversion is carried out with the nonlinear optical crystal heated to 40° C. or higher. Thus, optical damage can be suppressed and visible light absorption attributed to ultraviolet light can be reduced.

Objects, features and advantages of the present invention will become more apparent by the following detailed description and accompanying drawings.

BEST MODES FOR EMBODYING THE INVENTION

Embodiments of the present invention are described below with reference to the accompanying drawings. The following embodiments are specific examples of the present invention and not of the nature to limit the technical scope of the present invention.

First Embodiment

This embodiment is so constructed as to enable the generation of high-output short-wavelength light in an LN or LT nonlinear optical crystal. Optical damage at the time of generating short-wavelength light has been a problem in LN or LT nonlinear optical crystals. This is a phenomenon of changing a refractive index of a crystal by short-wavelength light, and it is known that optical damage can be reduced by adding a necessary amount of Mg (magnesium), In (indium), Zn (zinc) or Sc (scandium) to the LN or LT nonlinear optical crystals.

Thus, in the case of generating light in a visible region using a non-doped LN or LT nonlinear optical crystal, it has been conventionally general to use the nonlinear optical crystal at a high temperature of 100° or higher to reduce optical damage. Further, in the case of generating light in the visible region using an LN or LT nonlinear optical crystal added with Mg, In, Zn, Sc or the like, optical damage can be reduced. Thus, it is not necessary to use the nonlinear optical crystal at a high temperature and the nonlinear optical crystal has been generally used at or near room temperature.

On the contrary, we found out that green light absorption attributed to ultraviolet light generated at the time of a high-output wavelength conversion could be suppressed by increasing the temperature of an LN or LT nonlinear optical crystal including any one of additives Mg, In, Zn and Sc to a high temperature. In this case, light absorption in the crystal is suppressed as compared with a wavelength conversion in the above case of adding Mg, In, Zn, Sc or the like, wherefore a thermal lens effect is reduced and a degree of beam deterioration is also reduced. Further, by setting the element temperature to or below 100° C., a changed amount of refractive index per unit temperature is reduced as compared with the wavelength conversion in the above non-doped case, whereby a problem of narrowing a temperature tolerance is also solved.

We also found out that green light absorption attributed to ultraviolet light could be suppressed at a lower temperature by changing the type and amount of the additive added to a crystal including an LN as a main component. Thus, power consumption necessary to heat the element can be reduced and a starting speed of a light source can be increased.

Figure 1:
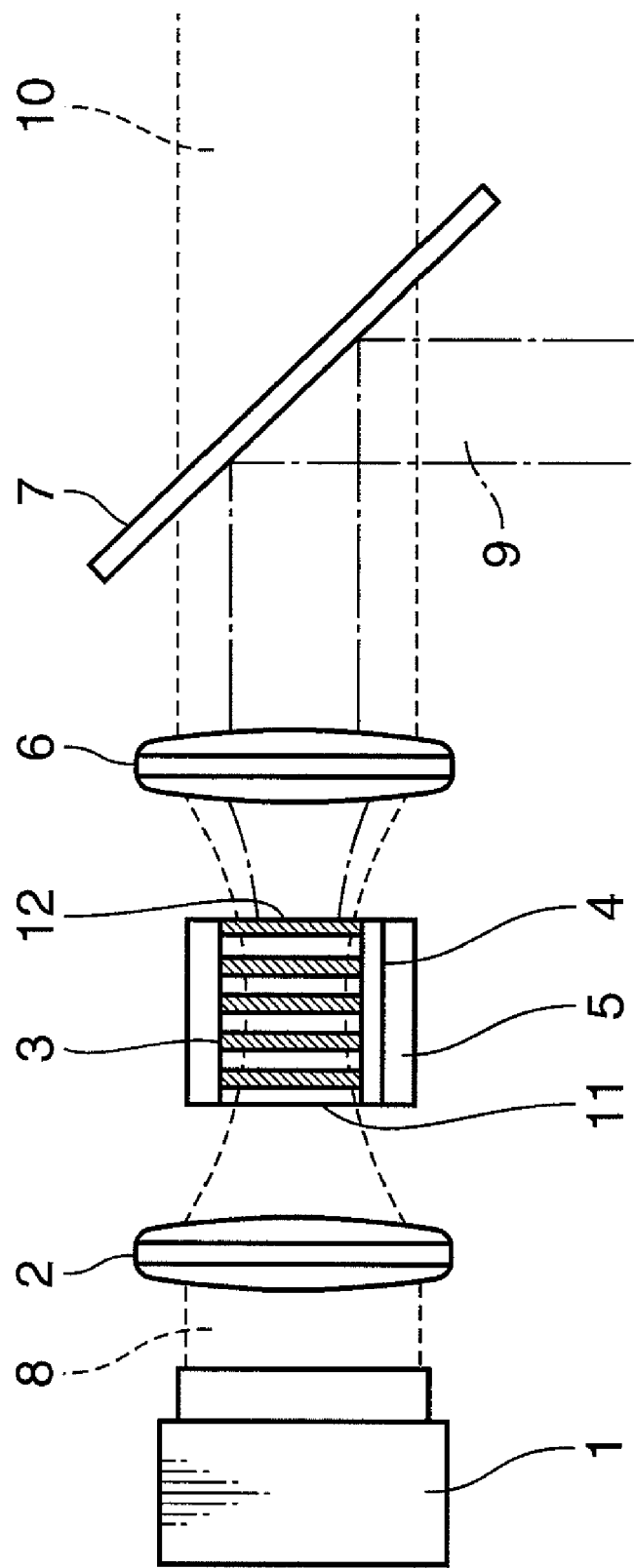
FIG. 1 is a diagram showing the construction of a wavelength converter according to a first embodiment of the invention.

FIG. 1 is a diagram showing the construction of a wavelength converter according to the first embodiment of the present invention. The wavelength converter shown in FIG. 1 is provided with an infrared light source 1, a first condenser lens 2, a wavelength conversion element 3, a heater 4, a heat insulating material 5, a second condenser lens 6 and a separation mirror 7.

The infrared light source 1 emits a fundamental wave having a wavelength of 2000 nm or shorter. Specifically, the infrared light source 1 is constructed by a Yb-doped fiber laser having an oscillation wavelength of 1064 nm. The infrared light source 1 emits parallel infrared light having a beam diameter of 500 μm. The first condenser lens 2 has a focal length f of 30 mm and condenses infrared light 8 emitted from the infrared light source 1 on the wavelength conversion element 3. At this time, a crystal polarization direction is aligned with a polarization direction of the incident infrared light.

The wavelength conversion element 3 is composed of a nonlinear optical crystal having a periodical polarization reversal structure and converts the fundamental wave emitted from the infrared light source 1 into a second harmonic wave. The wavelength conversion element 3 is composed of an LN added with 1.5 mol % of $Sc_2O_3$ and the temperature thereof is controlled at 80° C. or higher by the heater 4. Further, the wavelength conversion element 3 is formed with a periodical polarization reversal structure, the period of which is so designed as to quasi phase match at 40° C. or higher. In order to reduce the power consumption of the heater 4, the heater 4 and the wavelength conversion element 3 are preferably covered by the heat insulating material 5 except at a light incident surface 11 where the fundamental wave is incident and a light emergent surface 12 where the harmonic wave emerges. The heater 4 heats the wavelength conversion element 3 to a temperature at which quasi phase matching is established.

The second condenser lens 6 reconverts the infrared light having passed through the wavelength conversion element 3 and the generated second harmonic wave (green light) into parallel light. The separation mirror 7 separates the laser light emerging from the wavelength conversion element 3 into transmitted infrared light 10 and green light 9 as the second harmonic wave. The periodical polarization reversal structure is effective in output stabilization in the case of using the element at a high temperature.

In the case of using an LN or LT crystal while raising the temperature thereof, a pyroelectric effect is created by a temperature change of the crystal to generate an electric field distribution in a substrate. Since the LN crystal or LT crystal has an electro-optical effect, there occurs a phenomenon that a refractive index distribution is generated by an electric field and a phase matching condition becomes unstable. On the contrary, when the wavelength conversion element 3 is formed with the periodical polarization reversal structure, directions of pyroelectric effects created by adjacent polarization reversal portion and polarization non-reversal portion differ. Thus, electric fields cancel out in the adjacent polarization reversal portion and polarization non-reversal portion, whereby output instability can be prevented.

In this embodiment, the infrared light source 1 corresponds to an example of a fundamental wave light source and the heater 4 corresponds to an example of a heating unit.

Figure 2:
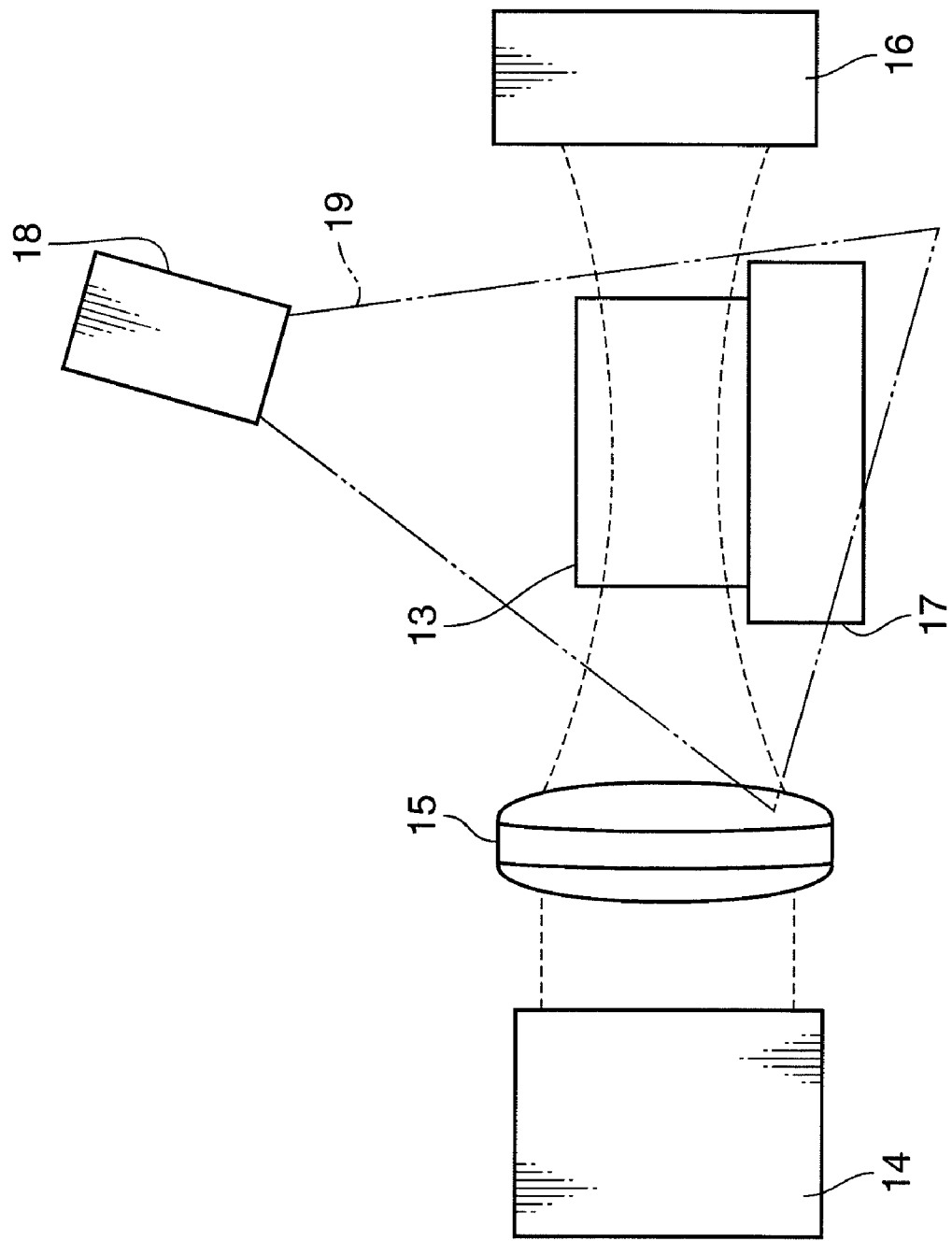
FIG. 2 is a diagram showing the construction of an experimental arrangement for measuring a light absorption characteristic.

Here is described a method for measuring a light absorption characteristic in a nonlinear optical crystal. FIG. 2 is a diagram showing the construction of an experimental arrangement for measuring a light absorption characteristic. The experimental arrangement shown in FIG. 2 is provided with a measurement sample 13, a green light source 14, a condenser lens 15, a photodiode 16 and a heater 17.

The measurement sample 13 is produced by cutting a nonlinear optical crystal into a piece having a thickness of 1 mm, a length of 5 mm in a longitudinal direction (beam path) and a width of 10 mm and optically polishing the opposite end surfaces (surfaces of 1 mm×10 mm). The green light source 14 emits green light having a wavelength of 532 nm. The condenser lens 15 condenses the green light such that a beam diameter of the green light is about 200 μm in the measurement sample 13. The photodiode 16 measures an output of the green light having passed through the measurement sample 13. The heater 17 heats the measurement sample 13. An ultraviolet light irradiator 18 irradiates ultraviolet light 19 having a wavelength of 400 to 340 nm to the beam path of the green light in the measurement sample 13.

In an experiment, the temperature of the measurement sample 13 was changed using the heater 17 with the measurement sample 13, the green light source 14, the condenser lens 15, the photodiode 16 and the heater 17 fixed, and the ultraviolet light 19 emitted from the ultraviolet light irradiator 18 was irradiated to the beam path of the green light in the measurement sample 13.

A green light output before the irradiation of the ultraviolet light 19 and that during the irradiation of the ultraviolet light 19 were monitored by the photodiode 16 to measure an absorption rate of the green light by the ultraviolet light irradiation. Hereinafter, this absorption rate is called a UVIGA (UltraViolet Induced Green Absorption) rate. By this measuring method, an increase of the absorption rate of visible light (light of 532 nm here) by the ultraviolet light was measured. A value of the UVIGA rate is correlated to a resistance of the crystal to crystal destruction and a decrease of the UVIGA rate means a reduction of light absorption, i.e. an improvement of high-output resistance. The correlation between the UVIGA rate and the high-output resistance of the crystal was empirically confirmed, and the resistance to crystal destruction was about 2.5 W for light of 532 nm when the UVIGA rate was 10%. The resistance to crystal destruction was 3 W or higher when the UVIGA rate is 5%.

Figure 3:
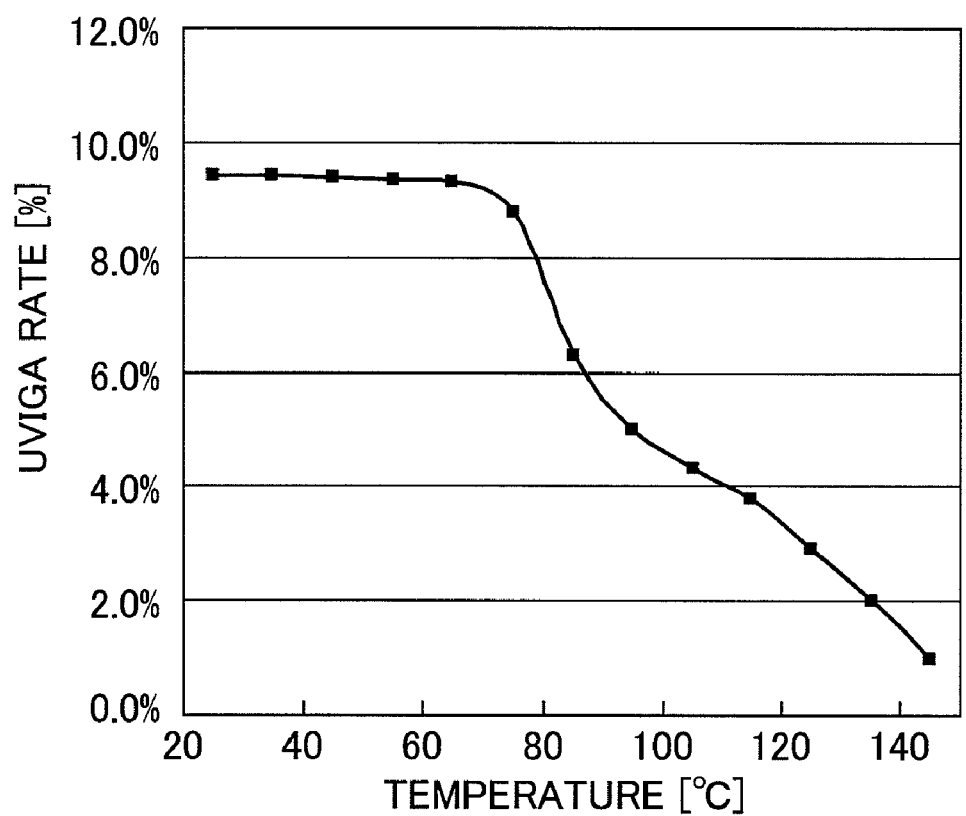
FIG. 3 is a graph showing a relationship between the temperature of an LN crystal added with 5.0 mol % of MgO and a UVIGA rate.

FIG. 3 is a graph showing a relationship between the temperature of an LN crystal added with 5.0 mol % of MgO and the UVIGA rate. An LN having a congruent composition ([Li/(Li+Nb)] ratio of 0.46 to 0.482: congruent melt composition) doped with 5.0 mol % of MgO was used as the measurement sample 13. The temperature of the measurement sample 13 was changed from 25° C. to 255° C. and a change of the UVIGA rate was monitored.

As a result, it was found that the UVIGA rate did not change in a temperature range of the measurement sample 13 from 25° C. to 80° C. and decreased by heating the measurement sample 13 to or above 80° C. as shown in FIG. 3. Since the UVIGA rate was 1% or lower at 145° C. or higher, it is not shown in FIG. 3. In this way, the absorption rate of the green light by the ultraviolet light irradiation is reduced by increasing the element temperature to 80° C. or higher, wherefore a high-output wavelength conversion with an output exceeding several W is thought to be possible.

Subsequently, a polarization reversal process was performed for the LN doped with 5.0 mol % of MgO by forming an electrode by a photo process and applying an electric field as disclosed in patent literature 1. First of all, a metal film to serve as an electrode material was deposited on such a substrate (Z-plate) (having a thickness of 1 mm in this embodiment) having the opposite surfaces optically polished that a Z-axis direction as a dielectric main axis was perpendicular to the substrate surfaces. Subsequently, photoresist was applied to form an electrode pattern by a contact exposure method. Thereafter, a metal electrode was formed by a dry etching apparatus and, then, a dielectric body was formed on the metal film. A polarization reversal structure was formed in the crystal by applying a pulse electric field to the electrode. A reversal period A at this time was set at 6.95 μm, 6.90 μm, 6.85 μm and 6.80 μm at which a second harmonic wave of 1064 nm was respectively generated at 30° C., 60° C., 90° C. and 120° C. The length of the devise was set at 25 mm.

A wavelength conversion at high conversion efficiency is possible by forming the periodical polarization reversal structure in the LN to produce a quasi phase matching wavelength conversion element. The quasi phase matching wavelength conversion element is capable of a wavelength conversion at an arbitrary temperature by changing its period and is preferable as this embodiment.

Figure 4:
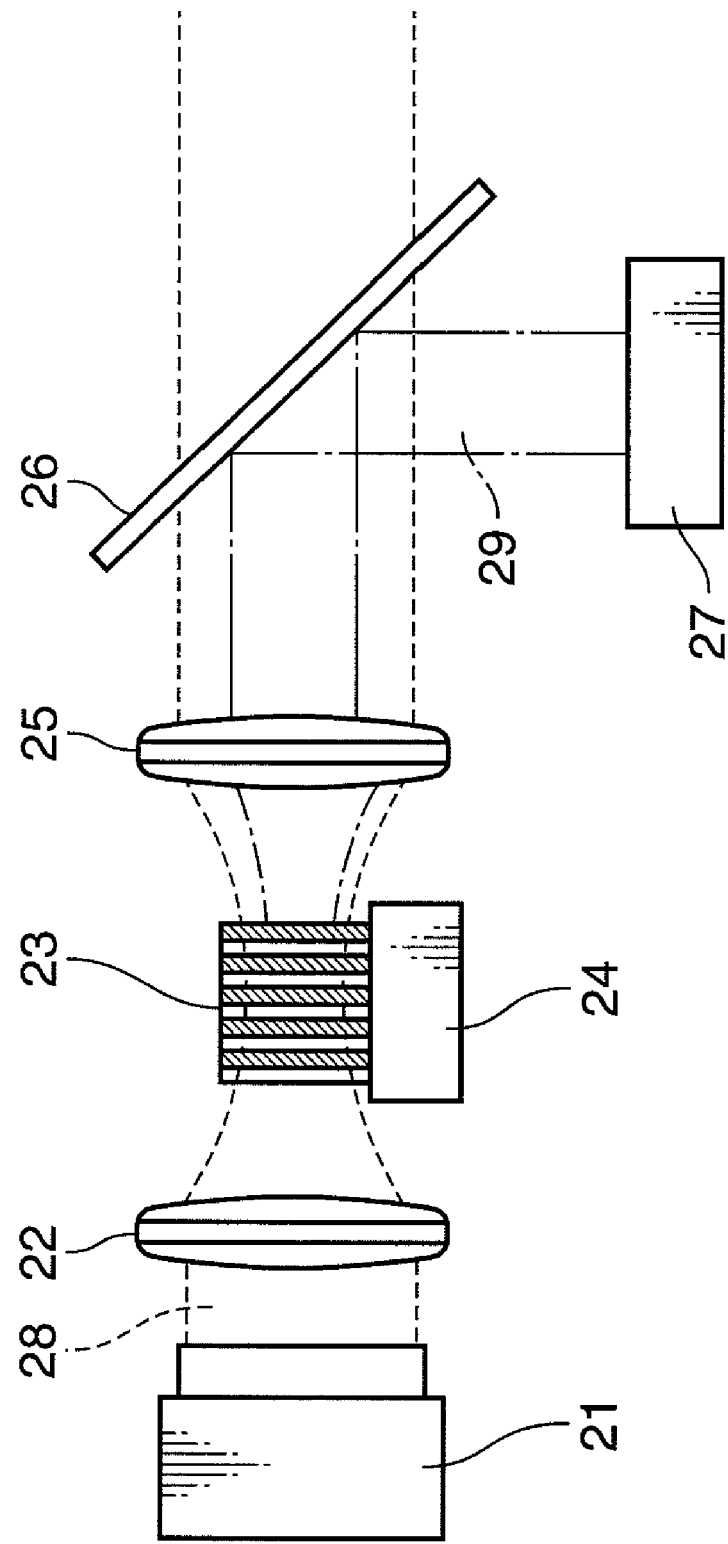
FIG. 4 is a diagram showing the construction of an experimental arrangement for measuring a wavelength conversion characteristic of a wavelength conversion element.

A wavelength conversion characteristic was actually evaluated for the thus formed wavelength conversion element. FIG. 4 is a diagram showing the construction of an experimental arrangement for evaluating the wavelength conversion characteristic of the wavelength conversion element. The experimental arrangement shown in FIG. 4 is provided with an infrared light source 21, a first condenser lens 22, a wavelength conversion element 23, a heater 24, a second condenser lens 25, a separation minor 26 and a power meter 27.

The infrared light source 21 is constructed by a Yb-doped fiber laser having an oscillation wavelength of 1064 nm. The infrared light source 21 emits parallel infrared light having a beam diameter of 500 μm. The first condenser lens 22 has a focal length f of 30 mm and condenses infrared light 28 emitted from the infrared light source 21 on the wavelength conversion element 23. The temperature of the wavelength conversion element 23 is controlled by the heater 24. At this time, room temperature was set at about 25° C. The second condenser lens 25 reconverts the infrared light having passed through the wavelength conversion element 23 and a generated second harmonic wave (green light) into parallel light. The separation mirror 26 separates the parallel light into the infrared light 28 and green light 29 as the second harmonic wave. The power meter 27 measures the separated green light 29.

Figure 5:
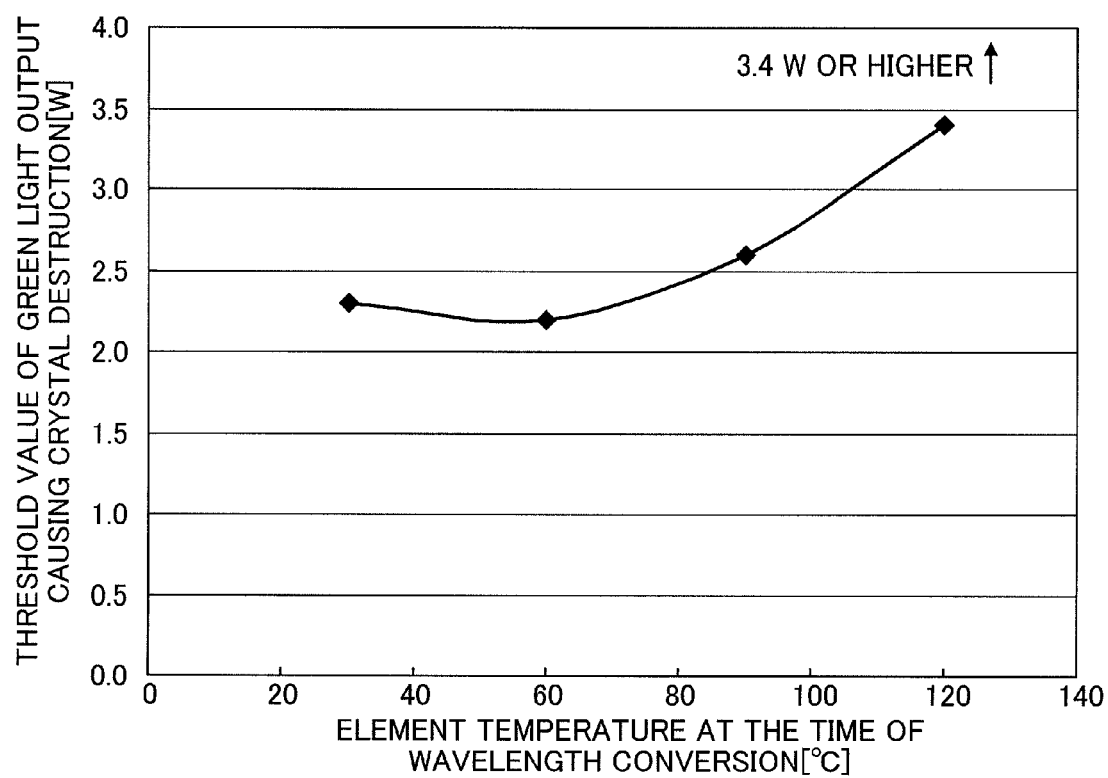
FIG. 5 is a graph showing a relationship between an element temperature at the time of a wavelength conversion and a green light output at the time of crystal destruction.

FIG. 5 is a graph showing a relationship between the element temperature at the time of a wavelength conversion and a green light output at the time of crystal destruction. Crystal destruction occurred near 2.2 W when the element temperature was 30° C. and 60° C. while having occurred near 2.6 W when the element temperature was 90° C. However, the crystal was not destroyed even at the time of generating green light of 3.4 W when the element temperature was 120° C.

From the above, it is possible to simultaneously alleviate both problems of avoiding optical damage and reducing visible light absorption attributed to ultraviolet light, which were conventionally difficult to realize, by performing a wavelength conversion at a temperature of 80° C. or higher where the UVIGA rate decreases.

It was further found by the experiment that the temperature at which the UVIGA rate decreased was related to a molar concentration of MgO added to the LN.

Figure 6:
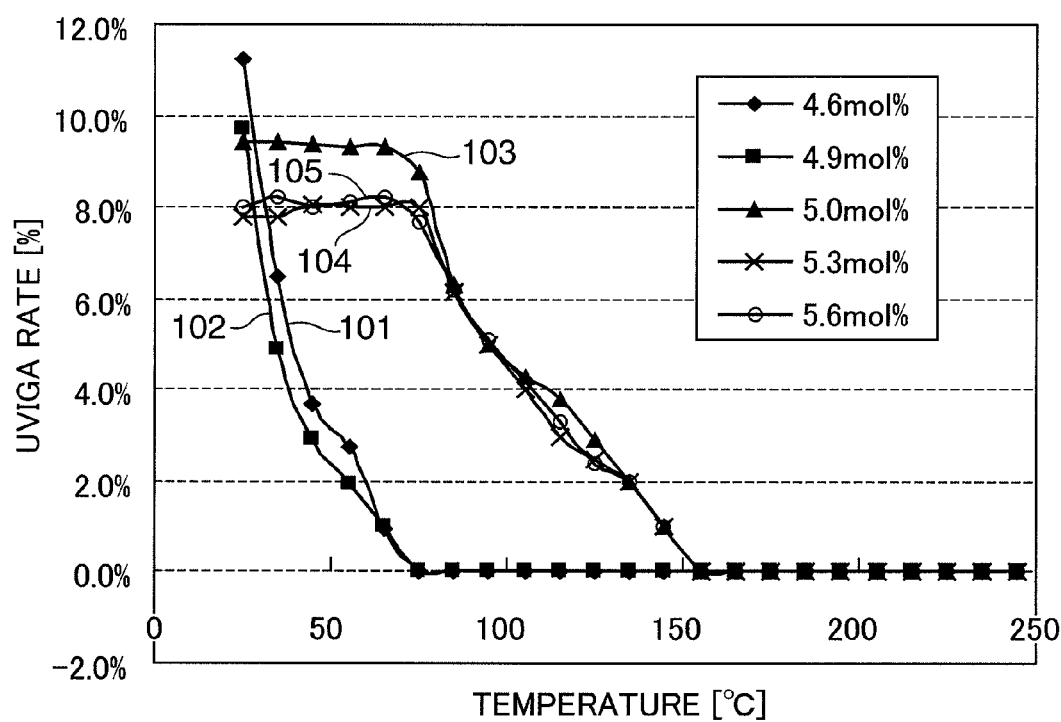
FIG. 6 is a graph showing a relationship between the temperatures of elements composed of LNs added with 4.6 mol % of MgO, 4.9 mol % of MgO, 5.0 mol % of MgO, 5.3 mol % of MgO and 5.6 mol % of MgO and a UVIGA rate.

FIG. 6 is a graph showing a relationship between the temperatures of elements composed of LNs added with 4.6 mol % of MgO, 4.9 mol % of MgO, 5.0 mol % of MgO, 5.3 mol % of MgO and 5.6 mol % of MgO and the UVIGA rate. In FIG. 6, temperature changes 101, 102, 103, 104 and 105 respectively indicate changes with temperature of the UVIGA rates of the LNs added with 4.6 mol % of MgO, 4.9 mol % of MgO, 5.0 mol % of MgO, 5.3 mol % of MgO and 5.6 mol % of MgO. In this experiment, the temperatures of measurement samples were changed from 25° C. to 255° C. and the values of the UVIGA rates were monitored.

When the element temperature was 25° C., the UVIGA rate of the measurement sample added with 5.3 mol % of MgO was lowest and about 8%. However, it was found that the UVIGA rate of the measurement sample added with 5.3 mol % of MgO did not change even when the element temperature was increased to about 80° C. and decreased when the element temperature was set at 80° C. or higher similar to the UVIGA rate of the measurement sample added with 5.0 mol % of MgO and the UVIGA rate of the measurement sample added with 5.6 mol % of MgO.

Similarly, when the element temperature was 25° C., the UVIGA rate of the measurement sample added with 4.6 mol % of MgO and that of the measurement sample added with 4.9 mol % of MgO were respectively 11.2% and 9.7% and higher than that of the measurement sample added with 5.0 mol % of MgO. However, it was found that the UVIGA rate of the measurement sample added with 4.6 mol % of MgO and that of the measurement sample added with 4.9 mol % of MgO decreased with an increase in temperature and were equal or lower than half the UVIGA rate of the measurement sample added with 5.0 mol % of MgO at 40° C. or higher.

Figure 7:
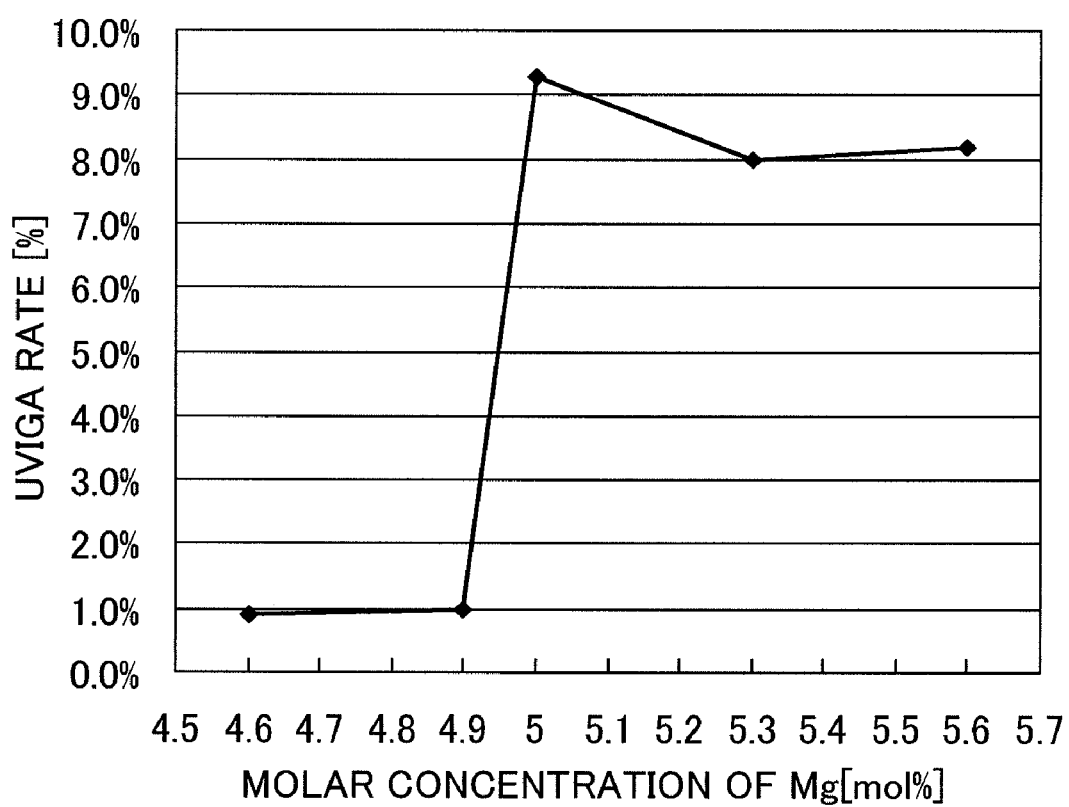
FIG. 7 is a graph showing a relationship between UVIGA rates of LNs added with MgO at 65° C. and a molar concentration of Mg.

FIG. 7 is a graph showing a relationship between the UVIGA rates of the LNs added with MgO at 65° C. and a molar concentration of Mg. As shown in FIG. 7, when the element temperature was 65° C., the UVIGA rates of the measurement sample added with 4.6 mol % of MgO and the measurement sample added with 4.9 mol % of MgO were respectively about 1.0%. On the other hand, the UVIGA rate of the measurement sample added with 5.0 mol % of MgO suddenly increased to about 9.3%. Further, the UVIGA rates of the measurement sample added with 5.3 mol % of MgO and the measurement sample added with 5.6 mol % of MgO were respectively about 8.0% and 8.2%.

Thus, it was found that light absorption could be reduced by adding the LN with 4.6 mol % of MgO or 4.9 mol % of MgO when the element temperature was 65° C.

It had been known that conventional wavelength conversion elements avoided optical damage by adding 5.0 mol % or more of MgO thereto. More specifically, it was found that no optical damage occurred for wavelength conversion elements added with 4.8 mol % or more of MgO.

Also in the case of adding an LN with $Sc_2O_3$ or ZnO, it was found that both problems of avoiding optical damage and reducing green light absorption attributed to ultraviolet light could be solved by increasing the temperature. Here, LNs added with $Sc_2O_3$ or ZnO are produced using a Czochralski method similar to LNs added with MgO.

Figure 8:
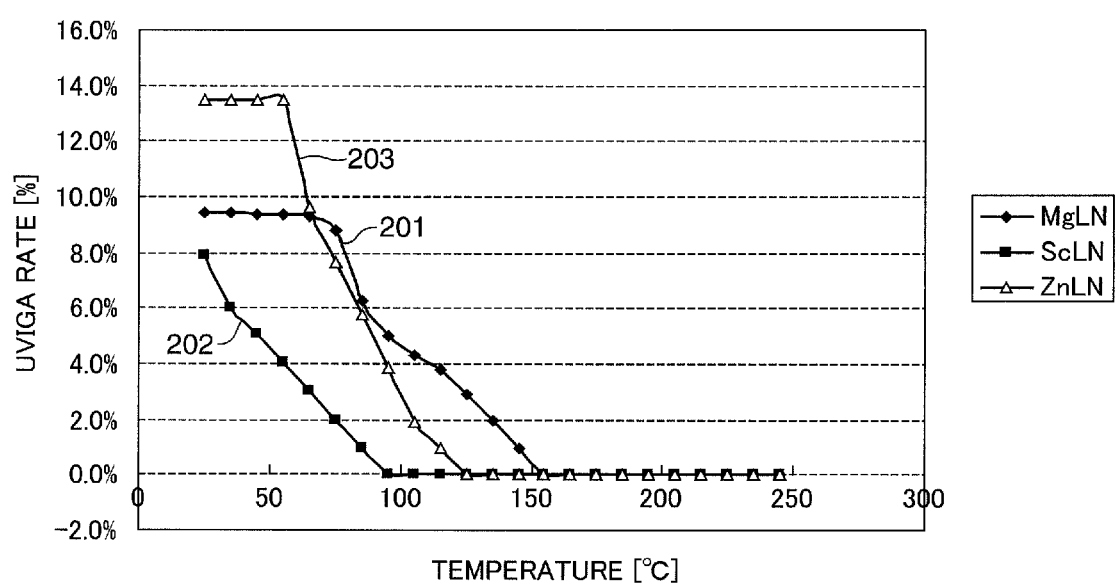
FIG. 8 is a graph showing a relationship between a UVIGA rate of an LN added with 5.0 mol % of MgO and an element temperature, a relationship between a UVIGA rate of an LN added with 1.5 mol % of $Sc_2O_3$ and the element temperature, a relationship between a UVIGA rate of an LN added with 7.5 mol % of ZnO and the element temperature.

FIG. 8 is a graph showing a relationship between a UVIGA rate of an LN added with 5.0 mol % of MgO and an element temperature, a relationship between a UVIGA rate of an LN added with 1.5 mol % of $Sc_2O_3$ and an element temperature, and a relationship between a UVIGA rate of an LN added with 7.5 mol % of ZnO and an element temperature. In FIG.

8, temperature changes 201, 202 and 203 respectively indicate changes with temperature of the UVIGA rate of the LN added with 5.0 mol % of MgO, the UVIGA rate of the LN added with 1.5 mol % of $Sc_2O_3$ and the UVIGA rate of the LN added with 7.5 mol % of ZnO.

As shown in FIG. 8, decreases of the UVIGA rate could be confirmed at high temperatures also in the case of adding $Sc_2O_3$ or ZnO. Particularly, the measurement sample added with $Sc_2O_3$ can reduce green light absorption at the time of ultraviolet light irradiation by about 30% even at a temperature of about 30° C. as compared with the conventionally used measurement sample added 5.0 mol % of MgO. The UVIGA rate of the measurement sample added with ZnO that is inexpensive similar to the MgO is lower than that of the measurement sample added with 5.0 mol % of MgO conventionally used at 70° C. or higher. It is also found that no optical damage occurs in the LN added with 1.5 mol % of $Sc_2O_3$ and the LN added with 7.5 mol % of ZnO.

From the experimental results of FIGS. 6 to 8, a temperature characteristic of the UVIGA rate turned out to be divided into a group in which the UVIGA rate starts decreasing at a relatively high temperature of 80° C. or higher and a group in which the UVIGA rate decreases even at a low temperature of about 40° C. It is thought that the UVIGA rate does not gradually change, but has a characteristic of either one of the two groups. This characteristic is similar to optical damage resistance in LN and LT crystals. Optical damage resistance also does not gradually change, and elements with resistance and elements without resistance change at a certain amount of an additive. This boundary lies near about 4.8 mol % in the case of Mg-doped $LiNbO_3$. However, it was revealed that changes the optical damage resistance and the UVIGA rate with temperature did not simultaneously occur and that the optical damage resistance was good and the UVIGA rate decreased at low temperatures in a small region of equal to or higher than 4.8 mol % and below 5 mol % in the Mg-doped LN crystal. It was found that the UVIGA rate could be reduced at a low temperature of 40 to 80° C. and a wavelength conversion element with optical damage resistance could be realized in this region.

Further, the UVIGA rate depends on the molar concentration of the additive and optical damage depends on (valence of the additive−1)×(molar concentration). What is important here is Sc. Since Sc is a trivalent ion, optical damage resistance can be realized by half the molar concentration of Mg. In the case of Mg, about 4.8 mol % or more Mg is necessary to improve the optical damage resistance. However, in the case of Sc, the strength of the optical damage resistance can be increased by a doping amount of about 2.4 mol % that is about half that of Mg.

On the other hand, since the UVIGA rate depends on the molar concentration of the additive, the UVIGA rate can be reduced at low temperatures in the case of an added amount of Sc or Mg below 5.0 mol %. Thus, in the case of Sc, an added amount of 2.4 mol % or more is necessary to improve the optical damage resistance and the added amount needs to be suppressed to or below 5.0 mol % in order to reduce the UVIGA rate. In the case of realizing the optical damage resistance and a reduction of the UVIGA rate, the added amount may be controlled to be from 2.4 mol % to 5.0 mol %.

In other words, the nonlinear optical crystal is preferably a lithium niobate added with $Sc_2O_3$ in a molar concentration of 1.2 mol % or more.

In this case, it can be simultaneously realized to suppress the optical damage resistance and reduce the light absorption by establishing the phase matching condition at a temperature of 40° C. or higher in the lithium niobate added with $Sc_2O_3$ in a molar concentration of 1.2 mol % or more. Further, since a high-output characteristic can be maintained in a wide range of the added amount as compared with the case of adding Mg, it becomes easier to control the added amount and the production cost of the crystal can be reduced. Further, a Sc-doped crystal can be used at 80° C. or lower since having a good high-output resistance even at low temperatures. If the phase matching condition is established at 80° C. or lower, the temperature tolerance at which the phase matching condition is established by the temperature dependency of refractive index dispersion can be enlarged by about 10% as compared with the case where the phase matching condition is established at 100° C. or higher. Thus, a characteristic more stable against a temperature variation can be realized.

On the other hand, in the case of simultaneously adding Sc and another additive, e.g. Mg, it becomes possible to simultaneously realize the optical damage resistance and a reduction of the UVIGA rate by setting a value 2A+B to 4.8 mol % or more and a value A+B to 5.0 mol % or less if it is, for example, assumed that the molar concentration of Sc is A mol % and that of Mg is B mol %.

In the wavelength converter, power necessary to heat the wavelength conversion element can be reduced as the temperature of the wavelength conversion element approaches surrounding ambient temperature.

Our investigation also found that a wavelength conversion element composed of an LN or LT material formed with a polarization reversal structure underwent repeated heat cycles between 100° C. and 25° C. to cause a problem of increasing linear absorption rates of infrared light and green light in the crystal to reduce conversion efficiency. Thus, for example, in the case of using the wavelength conversion element on such a condition of heating it to 100° C. during use and reducing the temperature to room temperature of about 25° C. during non-use, a beam is deteriorated by a thermal lens effect even if green light absorption attributed to ultraviolet light is reduced in this embodiment. In order to avoid this problem, it is desirable to use the wavelength conversion element at least at 80° C. or lower. Alternatively, an increase of the linear absorption rate in the crystal needs to be suppressed.

Since a refractive index difference (difference between the refractive index of infrared light and that of green light) of the crystal changes and the phase matching condition is deviated as the temperature of the wavelength conversion element changes, the conversion efficiency decreases. Thus, the temperature needs to be maintained at an optimal temperature.

Figure 9:
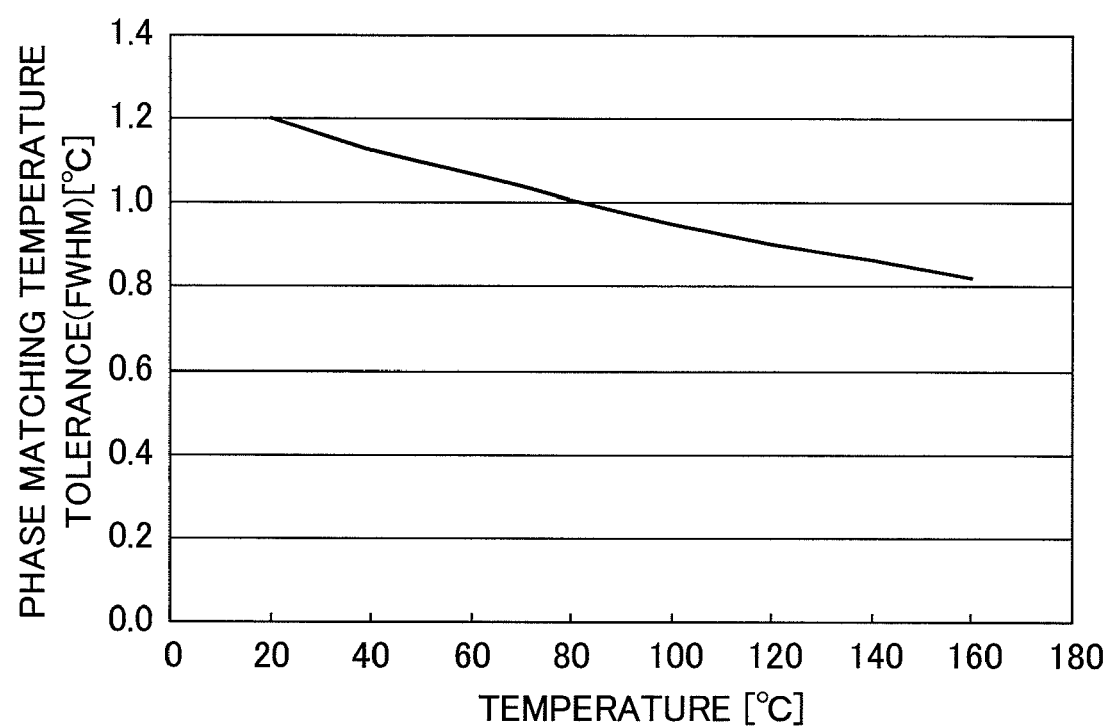
FIG. 9 is a graph showing a relationship between the temperature of a quasi phase matching wavelength conversion element having a length of 25 mm and a phase matching temperature tolerance.

FIG. 9 is a graph showing a relationship between the temperature of a quasi phase matching wavelength conversion element having a length of 25 mm and a phase matching temperature tolerance. A change of a refractive index difference in relation to an element temperature change decreases with a decrease in temperature and the temperature tolerance widens as shown in FIG. 9 by performing a wavelength conversion at a lower temperature. Thus, an output variation range caused by a temperature variation is reduced and the output is stabilized. By setting the element temperature at 80° C. or lower, the temperature tolerance can be enlarged by 5% or more as compared with the case where the element temperature is set at 100° C. Here, since the temperature tolerance is inversely proportional to the element length, the element length was calculated to be 25 mm. However, since an enlargement rate of the temperature tolerance caused by reduced temperature does not depend on the element length, the element temperature is preferably set at 80° C. or lower regardless of the element length.

In the LN nonlinear optical crystal, green light absorption is from 0.025 cm$^{-1}$ to 0.045 cm$^{-1}$. Thus, even in the case of using a wavelength converter for reducing green light absorption attributed to ultraviolet light, the amount of heat generated by the light absorption increases at the time of a high-output wavelength conversion of about several W. A thermal lens effect is created by a temperature distribution caused by this generated heat and the beam is deteriorated, wherefore a conversion into high-quality high-output laser beam has been difficult.

A degree of the thermal lens effect is inversely proportional to thermal conductivity and proportional to a refractive index change rate with temperature. By setting the element temperature at 80° C. or lower, the refractive index change rate at the time of an output is reduced by 5% or more as compared with the case where the element temperature is set at 100° C. Further, the thermal conductivities of the LN and LT crystals are known to be inversely proportional to the element temperatures. Thus, by setting the element temperature at 80° C. (353 K) or lower, the thermal conductivity increases further by 5.6% as compared with the case where the element temperature is set at 100° C. (373 K). By combining the both effects, a high-output wavelength conversion of about 11% is possible.

From the above, it can be said to be preferable to solve the both problems of avoiding the optical damage and reducing the green light absorption attributed to the ultraviolet light by performing a wavelength conversion at a low temperature of 80° C. or lower, more preferably 70° C. or lower.

In a state where the temperature of the wavelength conversion element is lower than ambient temperature, dew condensation occurs on the light incident and emergent surfaces of the wavelength conversion element to scatter the laser light, wherefore the temperature of the wavelength conversion element is preferably set to 40° C. or higher.

Thus, the molar concentration of MgO to be added to the LN is preferably 4.8 mol % or more and below 5.0 mol % or it is preferable to add $Sc_2O_3$ to the LN and use the wavelength conversion element at a temperature of 40° C. or higher and 80° C. or lower.

In the case of Mg, it is difficult to accurately control the doping amount of 4.8 to 5.0 mol %, which causes a problem of reducing a crystal production yield. As a method for solving this, there is a method for adding a tiny amount of Sc. In the case of adding Sc, optical damage can be avoided with half the molar concentration of Mg. Thus, the sum total of the molar concentrations of Sc and Mg necessary to reduce optical damage can be smaller as compared with the case of adding only Mg, wherefore an allowable range of the molar concentration of the additives is widened. By adding 0.3 mol % or more of Sc, the molar concentration of Mg to be added necessary to realize both an improvement of optical damage resistance and a reduction of green light absorption attributed to ultraviolet light becomes 4.2 to 4.7 mol % and a Mg concentration tolerance becomes 0.5 mol %. Thus, it becomes easier to control an addition concentration of Mg.

The Mg concentration tolerance is most preferably 1.4 mol % or less and a larger tolerance is not necessary from the perspective of controlling the addition concentration of Mg. In other words, the molar concentration of added Sc may be 1.2 mol % or less. The lower the molar concentration of added Sc, the larger a cost reduction effect caused by the reduced amount of Sc. Further, it becomes possible to alleviate crystal faults caused and form a fine and uniform polarization reversal structure in a wide region in the polarization direction by adding Sc with a large atomic number. Thus, the addition of Sc is preferable in the production of a bulk-type wavelength conversion element which requires a uniform and fine polarization reversal structure in a wide region.

Since the absorption rate of infrared light in the crystal increases with an increase in the number of crystal faults, the crystal faults cause a reduction in conversion efficiency in the case of a resonant wavelength conversion element in which infrared light intensity in a crystal increases. Thus, the addition concentration of Sc is more preferably 0.9 mol % or less.

Since a lower molar concentration of impurities leads to a higher thermal conductivity, it is also effective in reducing the thermal lens effect.

By setting the molar concentration at 5.0 mol % or less also for oxide of Zn and In that can suppress optical damage by being added to the LN, both problems of avoiding optical damage at lower temperatures and reducing green light absorption attributed to ultraviolet light can be overcome.

Further, by adding both at least any one of bivalent elements Mg, In and Zn and trivalent element Sc to the LN, optical damage can be suppressed when the total molar concentration of the both additives is below 4.8 mol %. In this case, the added amount of Sc that is an expensive material can be more reduced than in the case where only an oxide of Sc is added, wherefore the both problems can be more inexpensively solved.

Although the LN having the congruent composition ([Li/(Li+Nb)] ratio of 0.46 to 0.482: congruent melt composition) is a main component and at least any one of oxides of Mg, Zn, In and Sc is added in this embodiment, the present invention is not particularly limited to this. By approximating an LN to a stoichiometric composition ([Li/(Li+Nb)] ratio of 0.500), the added amount of the additive can be more reduced, wherefore the both problems can be more easily solved.

Since optical damage can be avoided by adding 4.5 mol % or more of Mg in an LN with a [Li/(Li+Nb)] ratio of 0.484 to 0.500, a high-output wavelength conversion at a low temperature is possible by setting the added amount of Mg at 4.5 mol % or more and below 5.0 Mol %. This case is preferable since the tolerance of the added amount of Mg becomes 0.5 mol % and a crystal growth yield is drastically increased.

The thermal conductivity increases by causing the LN to have a stoichiometric composition. The LN preferably has a stoichiometric composition ([Li/(Li+Nb)] ratio of 0.496 to 0.500), whereby the thermal conductivity increases by 21%. Since optical damage is solved if the sum total of double the molar concentration of Sc and the molar concentration of at least any one of Mg, In and Zn is 1.0 mol % or more, it is possible to reduce the amount of the additives and realize lower cost.

By adding the heating unit (heater) in the construction of the wavelength converter, the nonlinear optical crystal can be maintained at a high temperature and high-output light can be stabilized. Further, by using the nonlinear optical crystal formed with periodical polarization reversal structure as the wavelength conversion element, phase matching is possible at an arbitrary temperature, a highly efficient phase matching condition can be satisfied on a high-temperature condition necessary for high output resistance and high efficiency can be realized.

Also for an LT which is a nonlinear optical crystal capable of avoiding optical damage by adding an oxide of at least any one of Mg, Zn, In and Sc and causes green light absorption attributed to ultraviolet light similar to the LN, it is thought that the both problems can be solved by reducing the molar concentration of the additive, increasing a crystal temperature and using the LT as a quasi phase matching wavelength conversion element.

Next, a construction is described which can solve the both problems of avoiding optical damage at lower temperatures and reducing light absorption by improving the structure of a wavelength conversion element.

Figure 10:
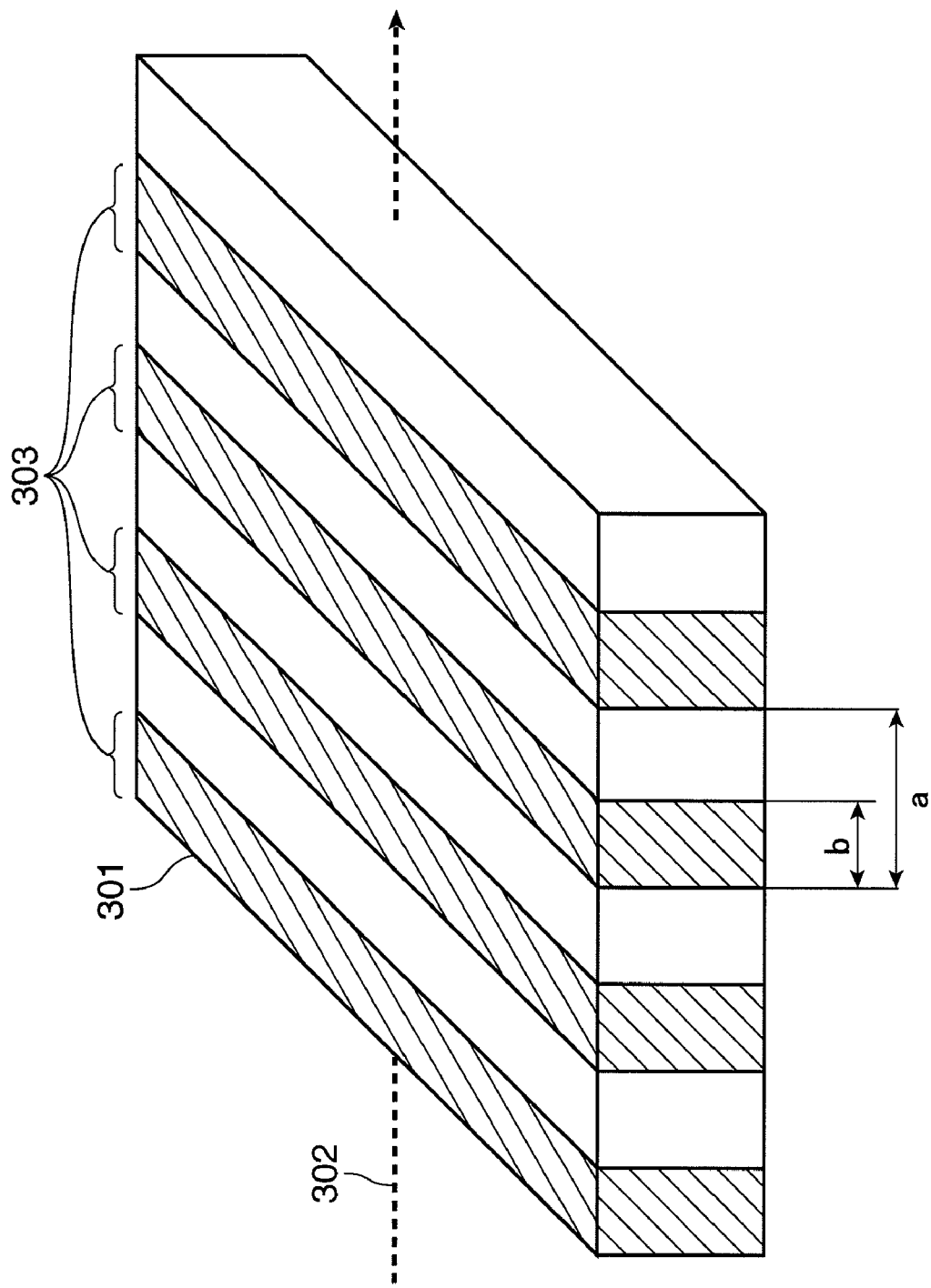
FIG. 10 is a diagram showing a periodical polarization reversal structure in the quasi phase matching wavelength conversion element.

A polarization direction of a quasi phase matching wavelength conversion element is periodically reversed as disclosed in patent literature 1. FIG. 10 is a diagram showing a periodical polarization reversal structure in a quasi phase matching wavelength conversion element.

When infrared light 302 is incident on a wavelength conversion element 301 to generate green light as shown in FIG. 10, the amount of the generated green light is known to depend on a ratio of polarization reversal sections 303 to the entirety (duty ratio (=b/a) %) in a part where the infrared light passes through the wavelength conversion element 301. However, when ultraviolet light is generated as a sum frequency of the infrared light and the green light, a phase matching period becomes about one-fourth of a phase matching period of generating the green light from the infrared light. Thus, the amount of the ultraviolet light generated in the element was also found to depend on the duty ratio.

Figure 11:
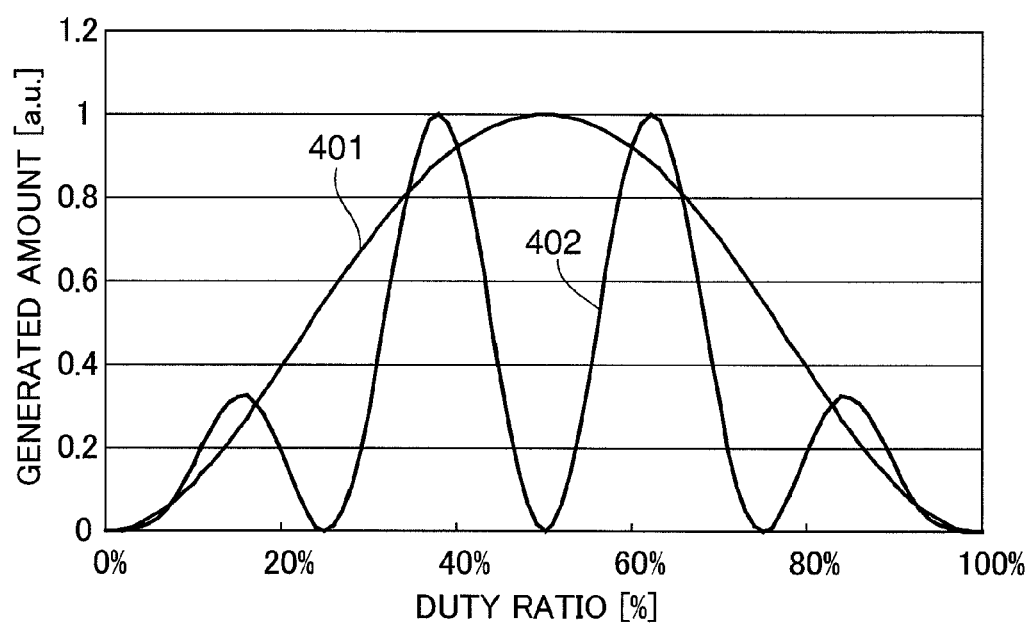
FIG. 11 is a graph showing a relationship between a generated amount of green light, a generated amount of ultraviolet light and a duty ratio.

FIG. 11 is a graph showing a relationship of the amount of generated green light, the amount of generated ultraviolet light and a duty ratio. It is found that the higher the light intensity of the ultraviolet light, the higher a green light absorption rate by the ultraviolet light. Thus, it is preferable to perform a wavelength conversion by causing infrared light to be incident on a wavelength conversion element with a duty ratio lying in a range of 45% or higher and 55% or lower where the amount 401 of the generated green light is large and the amount 402 of the generated ultraviolet light is little as shown in FIG. 11. Here, the influence of an efficiency reduction (pump depression) caused by infrared light attenuation by the wavelength conversion was considered, assuming that an infrared light input was 6 W and a green light output was 2 W at a duty ratio of 50%.

Although the conversion of the infrared light as a fundamental wave into the green light as a second harmonic wave is described in this embodiment, it is generally known that visible light having a wavelength of 400 nm to 800 nm is absorbed by ultraviolet light having a wavelength of 400 nm or shorter in an LN added with at least any one of Mg, Zn, Sc and In. In other words, when a fundamental wave having a wavelength of 800 nm to 1200 nm is incident on a wavelength conversion element to generate a second harmonic wave, a third harmonic wave generated as a sum frequency of the fundamental wave and the second harmonic wave induces the absorption of the second harmonic wave.

When a fundamental wave having a wavelength of 400 nm to 800 nm is incident on a wavelength conversion element to generate a second harmonic wave, the second harmonic wave induces the absorption of the fundamental wave. Further, when a fundamental wave having a wavelength of 1200 nm to 1600 nm is incident on a wavelength conversion element to generate a second harmonic wave, a fourth harmonic wave obtained by wavelength-converting the second harmonic wave induces the absorption of the second harmonic wave.

Further, when a fundamental wave having a wavelength of 1200 nm to 2000 nm is incident on a wavelength conversion element to generate a fourth harmonic wave, a fifth harmonic wave generated as a sum frequency of the fundamental wave and the fourth harmonic wave induces the absorption of the fourth harmonic wave. Likewise, when a fundamental wave having a wavelength of 1200 nm to 2000 nm is incident on a wavelength conversion element to generate both a second harmonic wave and a third harmonic wave, a fifth harmonic wave generated as a sum frequency of the second harmonic wave and the third harmonic wave induces the absorption of the third harmonic wave.

In this embodiment, a high output can be obtained without causing crystal destruction in any one of these wavelength conversion elements since the rate of visible light absorption induced by ultraviolet light can be reduced.

In FIG. 1, anti-reflection coating for preventing the reflection of at least the fundamental wave is preferably applied to the light incident surface 11 of the wavelength conversion element 3, whereby a transmission loss of the fundamental wave on the light incident surface 11 can be reduced and a more efficient wavelength conversion is possible.

Further, anti-reflection coating for preventing the reflection of at least the green light as the second harmonic wave and the ultraviolet light as the third harmonic wave is preferably applied to the light emergent surface 12 of the wavelength conversion element 3, whereby a transmission loss of the green light on the light incident surface 12 can be reduced and light intensities of the ultraviolet light and the green light in the element can be reduced.

It goes without saying that this exhibits similar effects also when a fundamental wave having a wavelength of 800 nm to 1200 nm is incident to generate a second harmonic wave. For the same reason, when a fundamental wave having a wavelength of 400 nm to 800 nm is incident to generate a second harmonic wave, it is preferable to apply anti-reflection coating for preventing the reflection of at least the fundamental wave to the light incident surface 11 and anti-reflection coating for preventing the reflection of at least the fundamental wave and the second harmonic wave to the light emergent surface 12.

Further, in the case of using a heater to heat the element, a time required for cooling becomes longer since the element has no cooling ability and is covered by the heat insulating material. Thus, it is further preferable to use an APC (Auto Power Control) for stabilizing a green light output by monitoring a part of the green light output as a result of a wavelength conversion using a photodiode and adjusting the incident power of the fundamental wave.

Figure 12:
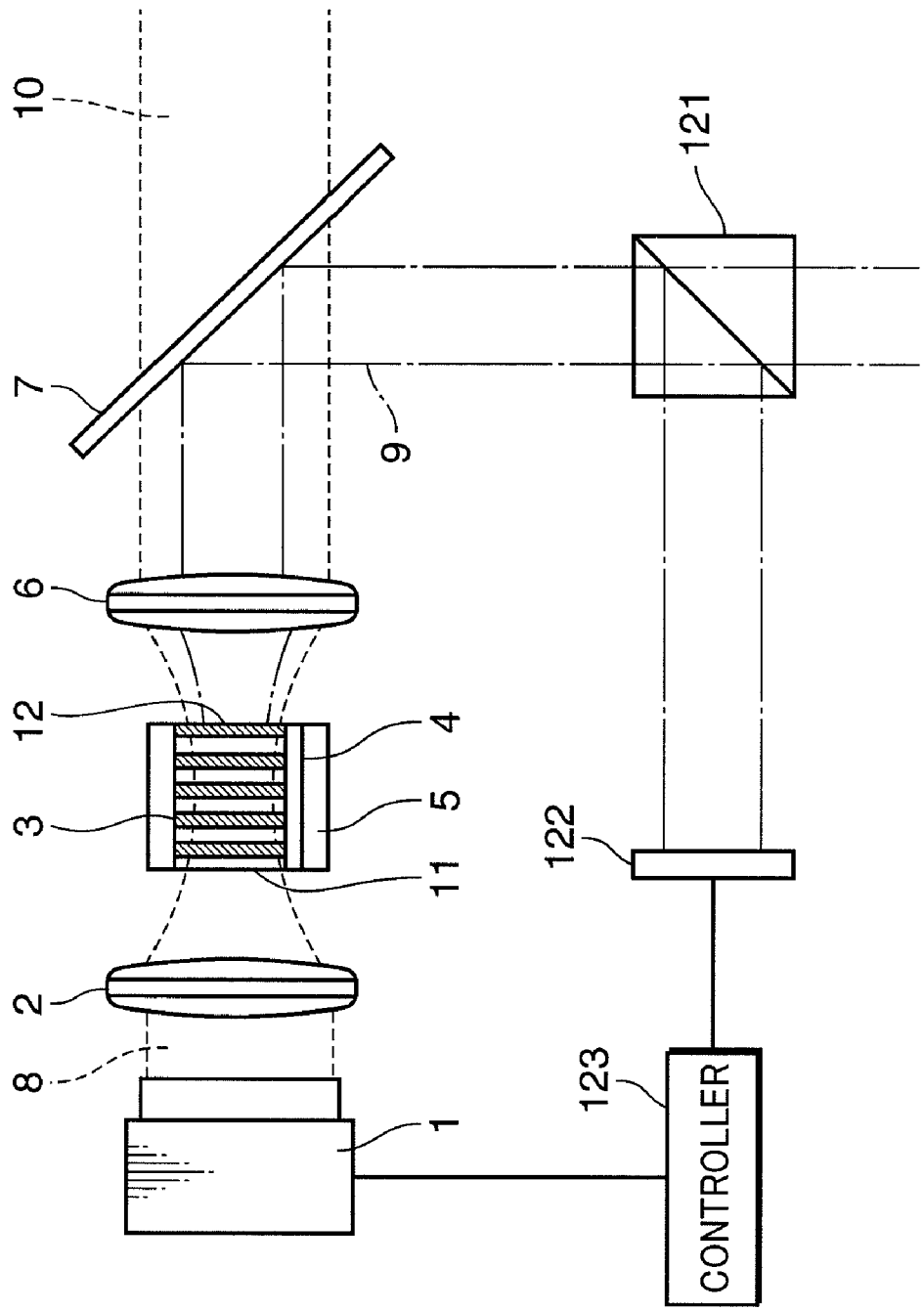
FIG. 12 is a diagram showing the construction of a wavelength converter according a modification of the first embodiment of the invention.

FIG. 12 is a diagram showing the construction of a wavelength converter according to a modification of the first embodiment of the present invention. The wavelength converter shown in FIG. 12 is provided with an infrared light source 1, a first condenser lens 2, a wavelength conversion element 3, a heater 4, a heat insulating material 5, a second condenser lens 6, a separation mirror 7, a beam splitter 121, a photodiode 122 and a controller 123. In the wavelength converter shown in FIG. 12, the same construction as the wavelength converter shown in FIG. 1 is identified by the same reference numerals and not described.

The beam splitter 121 reflects a part of green light separated by the separation mirror 7 while transmitting the other part. The photodiode 122 receives the green light reflected by the beam splitter 121 and measures a green light output. The controller 123 controls the amount of a current input to the infrared light source 1 so that the green light output measured by the photodiode 122 becomes constant.

Since peripheral parts of the wavelength conversion element 3 and the heater 4 are covered by the heat insulating material 5, power consumption can be suppressed upon heating the wavelength conversion element 3. Further, the output of the harmonic wave (green light) is measured by the photodiode 122, and the amount of the current input to the infrared light source 1 is controlled by the controller 123 so that the measured harmonic wave output becomes constant. Thus, the harmonic wave output can be stabilized.

Although the heater 4 is used as a heating unit in this embodiment, the present invention is not particularly limited to this and a Peltier element may be used. By using the Peltier element with a cooling function to regulate the temperature of the element, the output can be more stably controlled. In the case of using the Peltier element for the temperature regulation of the element, it is preferable that the top surface of the Peltier element is placed on the wavelength conversion element 3 and the wavelength conversion element 3 and the Peltier element are covered by the heat insulating material 5 except at the underside of the Peltier element and the light incident and emergent surfaces 11, 12.

Since the both problems of avoiding green light absorption attributed to ultraviolet light and optical damage can be solved in this embodiment, light intensity in the element can be further increased. In the wavelength conversion element, the higher the light intensity in the element, the higher the conversion efficiency. Thus, it is desirable to set a light intensity of not lower than 360 W/mm$^2$ which has been a threshold value for crystal destruction.

By setting the light intensity at or higher than 720 W/mm$^2$, the conversion efficiency can be further twice as high or higher although it depends on the infrared light input and the element length.

Further, the infrared light source 1 preferably emits a pulse oscillated fundamental wave to the wavelength conversion element 3. By pulse oscillating the incident fundamental wave, the conversion efficiency from the fundamental wave into the harmonic wave can be improved.

In the case of pulse light incidence, the amount of generated ultraviolet light increases in relation to infrared light and green light, whereby green light absorption attributed to ultraviolet light increases. Thus, crystal destruction has occurred at a lower output than in the case of continuous light oscillation. However, if green light absorption attributed to ultraviolet light is reduced by this embodiment, a high-output wavelength conversion is possible even in the case of pulse oscillation. In a wavelength conversion using a nonlinear optical crystal, the higher the light intensity in the element, the higher the conversion efficiency. Thus, it is desirable to set a duty ratio of the pulse oscillation at or below 50%, whereby the conversion efficiency becomes about twice as high or higher. Further, by setting the duty ratio at or below 30%, the conversion efficiency becomes about three times as high.

Second Embodiment

Figure 13:
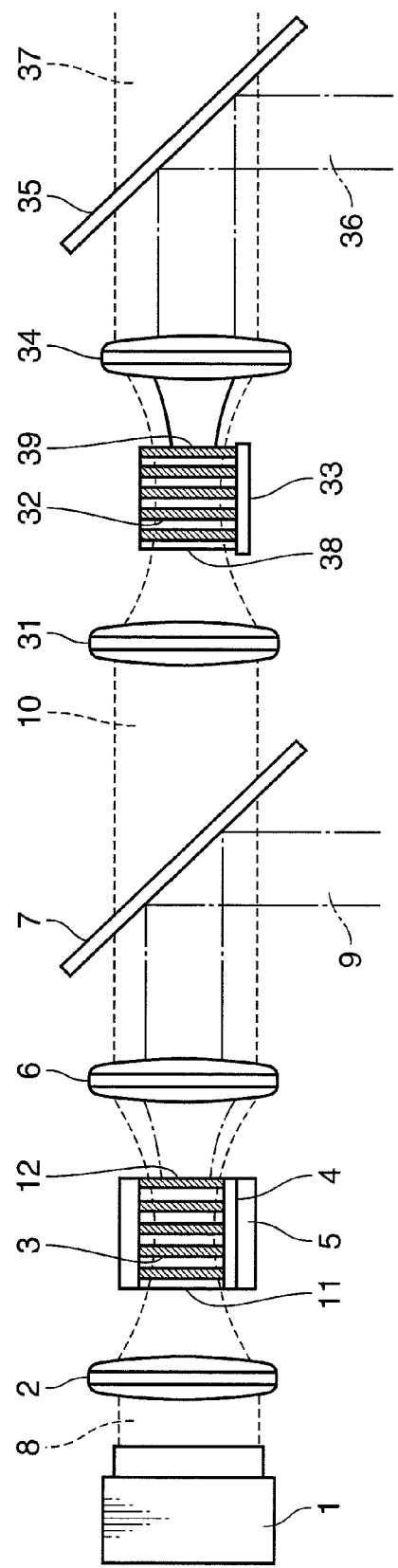
FIG. 13 is a diagram showing the construction of a wavelength converter according to a second embodiment of the invention.

Next is described a wavelength converter capable of a wavelength conversion with higher efficiency by using a plurality of wavelength conversion elements as shown in FIG. 13. The construction of this embodiment realizes a high-output short-wavelength light source by avoiding optical damage and reducing light absorption. However, the beam quality of a fundamental wave and a harmonic wave transmitting the wavelength conversion elements can be drastically improved by reducing light absorption. As a result, a characteristic can be remarkably improved in the construction of the present invention using the laser light source, which is described below.

FIG. 13 is a diagram showing the construction of a wavelength converter according to a second embodiment of the present invention. The wavelength converter shown in FIG. 13 is provided with an infrared light source 1, a first condenser lens 2, a wavelength conversion element 3, a heater 4, a heat insulating material 5, a second condenser lens 6, a separation mirror 7, a third condenser lens 31, a wavelength conversion element 32, a Peltier element 33, a fourth condenser lens 34 and a separation mirror 35. In the wavelength converter shown in FIG. 13, the same construction as the wavelength converter shown in FIG. 1 is identified by the same reference numerals and not described.

The wavelength conversion element 32 differs from the wavelength conversion element 3 in at least one of a substance added to the lithium niobate, the molar concentration of an additive, the phase matching temperature and an element length.

In this embodiment, the wavelength conversion element 3 corresponds to an example of a first wavelength conversion element and the wavelength conversion element 32 corresponds to an example of a second wavelength conversion element.

In a conventional laser light source for which no measure is taken to reduce light absorption, a thermal lens effect caused by light absorption has been produced not only at the time of a high output of several W at which the output becomes unstable, but also at the time of an output level of about 1 W. Thus, at an output of 1 W or higher, the wave fronts of a fundamental wave and a harmonic wave passing through a wavelength conversion element are disturbed to deteriorate beam quality. Therefore, it has been difficult to utilize a fundamental wave and a harmonic wave output from the wavelength conversion element with high beam quality. On the contrary, in the wavelength converter of this embodiment, light absorption can be drastically reduced, wherefore beam quality deterioration can be suppressed and high beam utilization efficiency can be realized. A specific example is shown below.

The wavelength converter shown in FIG. 13 is constructed such that at least either one of the harmonic wave and the fundamental wave output from the wavelength conversion element is wavelength-converted into a sum frequency or a harmonic wave by the wavelength conversion element again. In the conventional construction, the beam quality of a harmonic wave and a fundamental wave output from a first wavelength conversion element is largely deteriorated in the case of outputting a harmonic wave of 1 W or higher, and efficiency is largely reduced to about half or less of theoretical efficiency in the case of wavelength conversion by a second wavelength conversion element. On the contrary, in the construction of this embodiment, the conversion efficiency substantially coincides with the theoretical efficiency even in the case of a wavelength conversion by the second wavelength conversion element, which indicates that there is hardly any beam quality deterioration in the first wavelength conversion element.

In the wavelength converter of this embodiment, infrared light 10 having passed through the separation mirror 7 is condensed again on the wavelength conversion element 32 by the third condenser lens 31. At this time, a crystal polarization direction is aligned with a polarization direction of the incident infrared light 10. However, it is assumed that the second wavelength conversion element 32 is a quasi phase matching wavelength conversion element composed of an LN added with 4.8 mol % or more and 5.2 mol % or less of MgO and a quasi phase matching temperature is about 40° C.

If it is assumed that an infrared light output incident on the first wavelength conversion element 3 is 10 W and the element lengths of the wavelength conversion elements 3, 32 are both 25 mm, an output of green light 9 emerging from the first wavelength conversion element 3 is about 4 W and an output of the transmitted infrared light 10 incident on the second wavelength conversion element 32 is about 6 W. Thus, green light 36 generated in the second wavelength conversion element 32 is about 2 W. An LN added with 5.0 mol % of MgO and normally frequently used is preferably so used as the wavelength conversion element 32 as to have an element temperature of about 30° C.

Thus, the second wavelength conversion element 32 is more inexpensive than the first wavelength conversion element 3 by using an LN added with MgO or ZnO more inexpensive than $Sc_2O_3$. Further, in the case of adding MgO, a larger allowable range of from 4.8 mol % and more and 5.2 mol % or less centered on 5.0 mol % can be set for the molar concentration as compared with the case where the molar concentration of the additive is set within a range of from 4.8 mol % and more to 5.0 mol % or less, whereby a crystal growth yield is improved and the wavelength conversion element can be more inexpensive. Further, the wavelength conversion element 32 can also reduce power for heating the element by being so designed as to have a quasi phase matching temperature of about 40° C.

Since the temperature of the second wavelength conversion element 32 is close to room temperature, it is preferably regulated by the Peltier element 33 having a cooling function, and the emergent green light and infrared light are passed through the fourth condenser lens 34 and the green light 36 is extracted by the separation mirror 35. In the wavelength converter of this embodiment, green light of about 6 W is obtained from infrared light of 10 W. Similarly, also a wavelength converter using three or more wavelength conversion elements can have high output and high efficiency and can be inexpensive by changing the materials and phase matching temperatures of the wavelength conversion elements according to a green light output to be generated.

Further, by making the element length of the wavelength conversion element 3 shorter than that of the wavelength conversion element 32, an output of the green light 9 generated by the first wavelength conversion element 3 and an output of the green light 36 generated by the second wavelength conversion element 32 can be set substantially equal. Thus, in the case of using the wavelength converter as a light source for a display, in-plane light uniformity can be ensured by a simpler construction.

Although only infrared light is incident on the wavelength conversion element 32 in this embodiment, the present invention is not particularly limited thereto and the wavelength conversion element 3 may emit both infrared light as a fundamental wave and green light as a harmonic wave converted from the fundamental wave to the wavelength conversion element 32 and the wavelength conversion element 32 may generate a sum frequency of the fundamental wave and the harmonic wave. In this case, the wavelength converter has a construction obtained by deleting the separation mirror 7 from the wavelength converter of FIG. 13.

Although green light absorption attributed to ultraviolet light is reduced in this wavelength converter, light intensities of ultraviolet light and green light in the crystal are preferably low. Anti-reflection coating for preventing the reflection of at least the infrared light as the fundamental wave, the green light as the second harmonic wave and the ultraviolet light as the third harmonic wave is preferably applied to a light emergent surface 12 of the wavelength conversion element 3. This can reduce transmission losses of the infrared light and the green light in the light emergent surface 12 and reduce the light intensities of the ultraviolet light and the green light in the wavelength conversion element 3.

In this wavelength converter, anti-reflection coating for preventing the reflection of at least the infrared light as the fundamental wave is preferably applied to light incident surfaces 11, 38 of the wavelength conversion elements 3, 32. This can reduce a transmission loss of the fundamental wave in the light incident surfaces 11, 38 and enables a more efficient wavelength conversion.

Further, anti-reflection coating for preventing the reflection of at least the green light as the second harmonic wave and the ultraviolet light as the third harmonic wave is preferably applied to a light emergent surface 39 of the wavelength conversion element 32. This can reduce a transmission loss of the green light in the light emergent surface 39 and reduce the light intensities of the ultraviolet light and the green light in the wavelength conversion element 32.

Although the harmonic wave or the fundamental wave is repeatedly wavelength-converted by a plurality of wavelength conversion elements in the wavelength converter of this embodiment, the wavelength converter may include a fiber for introducing light and the fundamental wave or the harmonic wave output from the wavelength conversion element may be input to the fiber. Since light emerging from the wavelength conversion element in this embodiment has little quality deterioration of an output beam, it is possible to accomplish highly efficient coupling to the fiber laser.

Third Embodiment

Although the fundamental wave is wavelength-converted into the harmonic wave by the wavelength conversion element 3 in the wavelength converter of the first embodiment, the present invention is effective also in the case of being applied to an internal resonator type wavelength converter. In a third embodiment is described a resonator type wavelength converter using the wavelength conversion element shown in the first embodiment.

Figure 14:
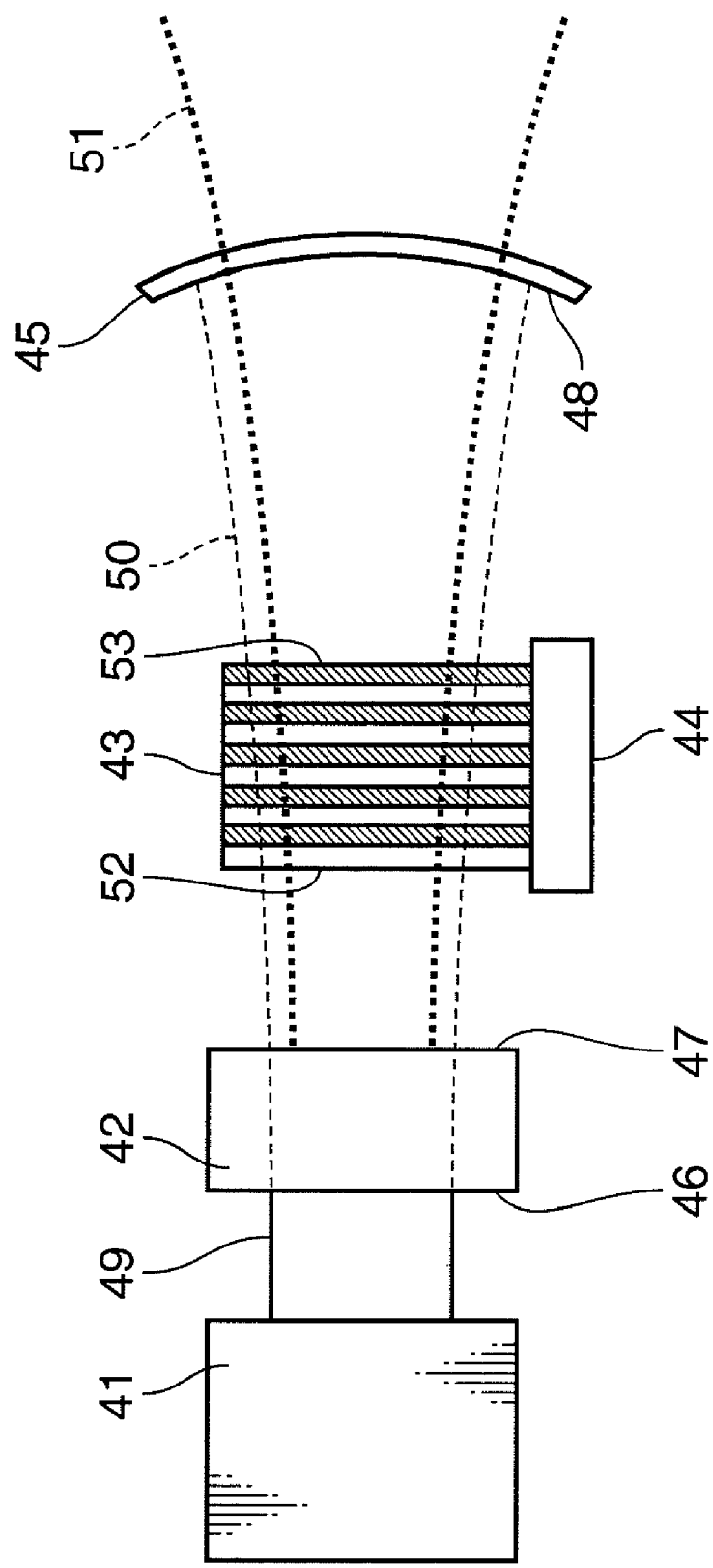
FIG. 14 is a diagram showing the construction of a wavelength converter according to a third embodiment of the invention.

FIG. 14 is a diagram showing the construction of a wavelength converter according to the third embodiment of the present invention. The wavelength converter shown in FIG. 14 is provided with a semiconductor laser chip 41, a solid-state laser 42, a wavelength conversion element 43, a heater 44 and a concave mirror 45.

The semiconductor laser chip 41 generates laser light 49 having a wavelength of 808 nm and emits the generated laser light 49 to the solid-state laser 42. The solid-state laser 42 is composed of Nd:YVO4 or the like, is excited by the laser light 49 and generates laser light 50 having a wavelength of 1064 nm.

HR-coating for 1064 nm is applied to an incident surface 46 of the solid-state laser 42 and an inner surface 48 of the concave mirror 45 to resonate the laser light. Further, the wavelength conversion element 43 is disposed between the concave mirror 45 and the solid-state laser 42 and emits laser light 51 having a wavelength of 532 nm. At this time, AR-coating for 1064 nm is applied to an emergent surface 47 of the solid-state laser 42, a light incident surface 52 and a light emergent surface 53 of the wavelength conversion element 43, HR-coating for 532 nm is applied to the emergent surface 47 of the solid-state laser 42 and AR-coating for 808 nm is applied to the incident surface 46 of the solid-state laser 42. Further, AR-coating for 532 nm is applied to the opposite end surfaces of the concave mirror 45.

The wavelength conversion element 43 is a nonlinear optical crystal composed of either LN or LT containing at least any one of Mg, In, Zn and Sc. The nonlinear optical crystal has a periodical polarization reversal structure. The heater 44 heats the wavelength conversion element 43 to or above 40° C.

In a conventional internal resonator type wavelength converter, a light loss in a resonator increases due to deterioration in the beam quality of a fundamental wave and a harmonic wave passing through a wavelength conversion element, thereby reducing conversion efficiency. On the contrary, if the construction of the third embodiment is used, light absorption of the nonlinear optical crystal can be drastically reduced. As a result, it becomes possible to suppress beam quality deterioration in the resonator and a highly efficient conversion characteristic can be realized even at the time of a high output.

In this embodiment, the semiconductor laser chip 41 corresponds to an example of a pump laser, the solid-state laser 42 to an example of a laser medium, and the concave mirror 45 and the incident surface 46 of the solid-state laser 42 to an example of a pair of resonator mirrors.

In the wavelength converter of the third embodiment, high conversion efficiency can be obtained even when the element length of the wavelength conversion element 43 is as short as 3 mm or shorter. In this case, a wide temperature tolerance of ±4° C. or larger can be ensured, wherefore a particularly preferable construction is realized in the case of using a wavelength converter in an image display which has wide interior temperature swings and requires a strict temperature control.

If the element length is set at or below 1 mm, it is further preferable since a wide temperature tolerance of ±12° C. or larger can be obtained. The size of the light source can be reduced in the wavelength converter of the third embodiment, and this wavelength converter is preferably used in a portable image display.

In the third embodiment, the light intensity of the infrared light of 1064 nm in the wavelength conversion element 43 is high and a reduction of the UVIGA rate becomes more important. In order to obtain a green light output of 0.5 W or higher required for an image display using the wavelength converter of the third embodiment, the UVIGA rate needs to be set at 7% or lower. If the UVIGA rate is above 7%, thermal runaway occurs due to heat generation in the wavelength conversion element 43 and, hence, a temperature control becomes difficult. A UVIGA rate of 5% or lower is more preferable since green light of 1 W or higher can be generated.

Fourth Embodiment

Figure 15:
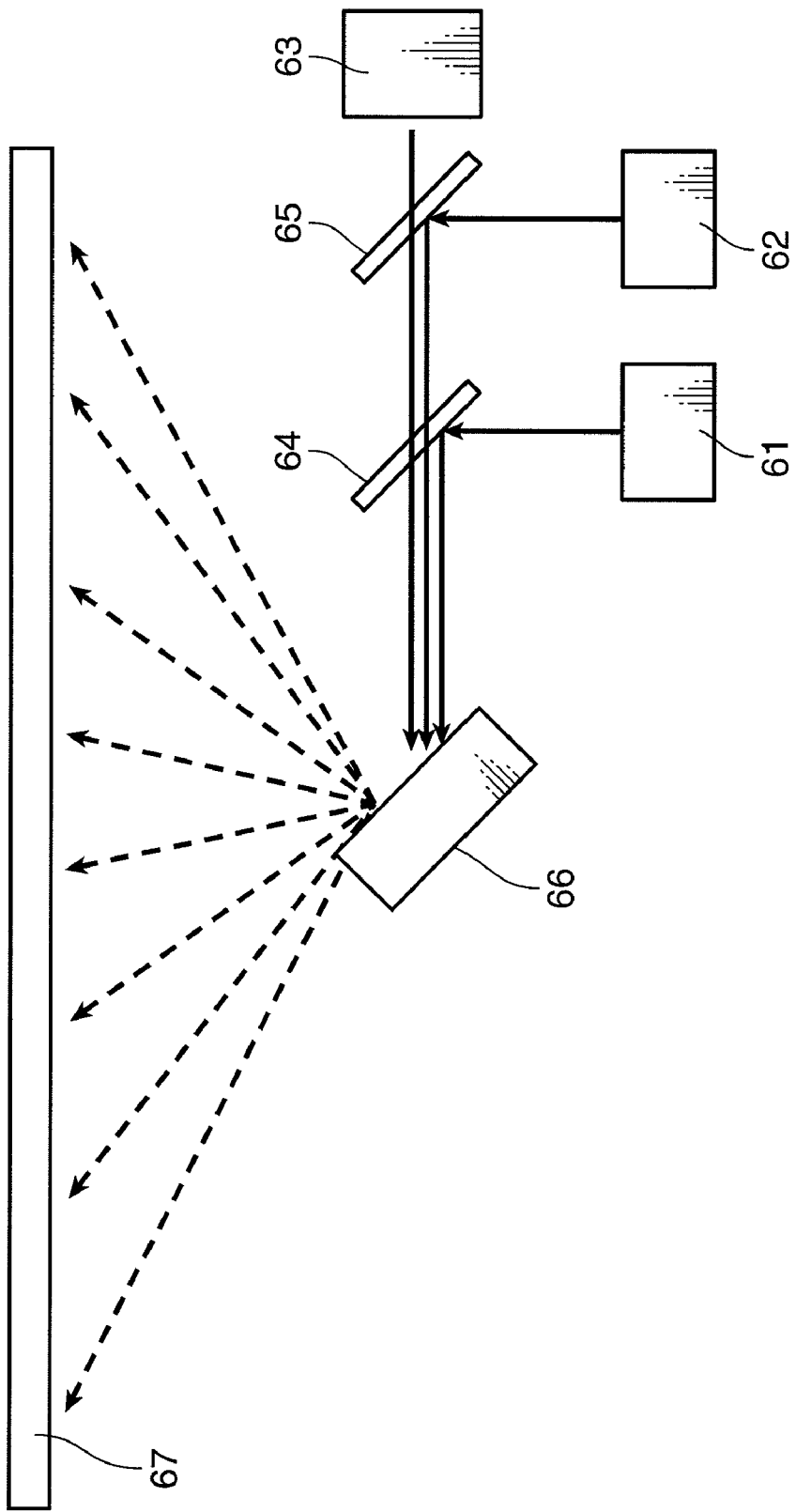
FIG. 15 is a diagram showing the construction of a wavelength converter according to a fourth embodiment of the invention.

In a fourth embodiment is shown a scanning type image display using green light obtained by the wavelength converter of FIG. 1. FIG. 15 is a diagram showing the construction of an image display according to the fourth embodiment of the present invention. The image display shown in FIG. 15 is provided with a red laser light source 61, a blue laser light source 62, a green laser light source 63, dichroic mirrors 64, 65 and a two-dimensional scanning mirror 66.

As shown in FIG. 15, the red, blue and green laser light sources 61, 62 and 63 are used as light sources. Here, the laser wavelength converter shown in FIG. 1 is used as the green laser light source 63. Red, blue and green laser light is combined by the dichroic mirrors 64, 65. The two-dimensional scanning mirror 66 scans a screen 67 with the laser light to display an image.

Accurate laser light positions and a small beam diameter are essential to the image display. In this embodiment, green light absorption attributed to ultraviolet light can be reduced, thereby preventing the occurrence of a thermal lens effect which has been conventionally produced. Thus, the beam diameter becomes stable and application to the image display requiring a small beam diameter as described above is suitable. Further, in the case of use for medical application in which emitted light is incident on a fiber, beam deterioration of the emitted green light caused by a thermal lens can be reduced, wherefore the efficiency of the light incident on the fiber can also be increased.

Figure 16:
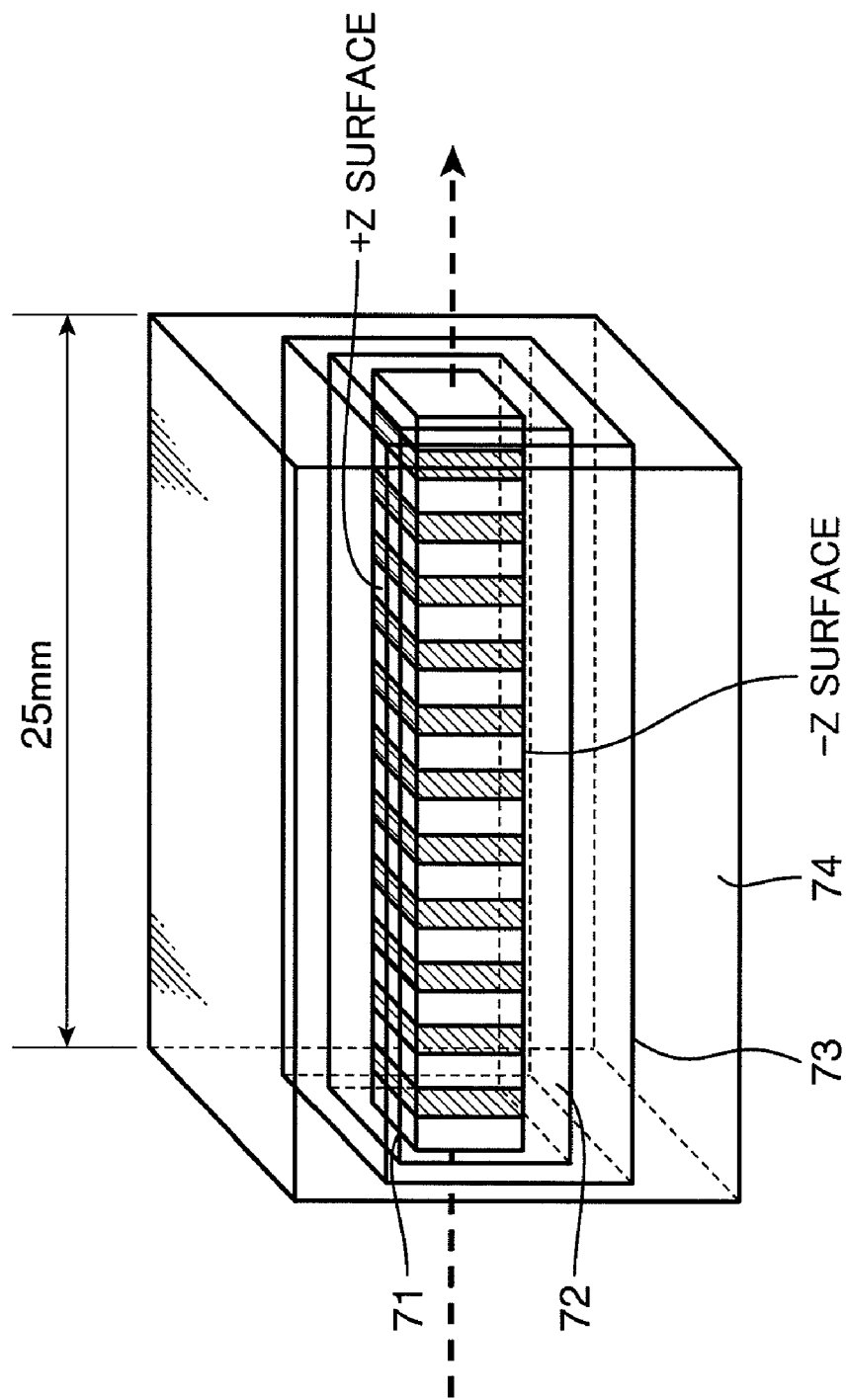
FIG. 16 is a diagram showing the construction of a peripheral part of the wavelength conversion element of the wavelength converter.

The image display is required to have a quick start-up of about 1 to 2 sec. In other words, in the green laser light source 63 using the wavelength converter, the element temperature needs to be heated to and stabilized at an optimal temperature (phase matching temperature) within a period of 1 to 2 sec. Thus, it is preferable to narrowly machine a wavelength conversion element 71 as shown in FIG. 16 to maximally shorten a distance between the heater 73 and a beam path. For example, if power for heating the heater 73 is assumed to be 4 W, a start-up period can be about 2 sec. in the case of heating from 20° C. to 80° C. by setting a cross-sectional area perpendicular to the beam path at or smaller than 2 mm$^2$ in the case of a wavelength conversion element having a length of 25 mm. Further, by setting the cross-sectional area at or smaller than 1 mm$^2$, a start-up speed of about 1 sec. is possible.

In this embodiment, a sudden temperature increase of the wavelength conversion element is necessary during the start-up. Our own investigation found that linear absorption rates of infrared light and green light in a nonlinear optical crystal formed with a polarization reversal structure increased due to the influence of a temperature change, wherefore it is preferable to take a measure as described below.

Specifically, it is preferable to cover side surfaces of the wavelength conversion element 71 excluding the light incident and emergent surfaces of the wavelength conversion element 71 with an insulating material 72 as shown in FIG. 16 and to cover at least the surfaces whose angles to a polarization direction are 90°±10 (including +Z surface and −Z surface) with the insulating material 72. This enables the suppression of a light absorption rate increase in the wavelength conversion element 71 even if there is a temperature change.

An electrical resistivity of the insulating material 72 is preferably 1×10$^8$ Ω·cm or higher. This enables the suppression of a light absorption rate increase even in the case of use for display application in which the temperature of the wavelength conversion element 71 is frequently changed.

Since a thin film formed by sputter film formation is contaminated with impurities, a DC drift of moving electric charges in the film occurs when a DC electric field is applied and, hence, a light absorption suppressing effect is insufficient. Thus, no DC drift preferably occurs in the insulating material 72. An insulating layer is preferably formed by a CVD (Chemical Vapor Deposition) method or the like that causes no DC drift rather than by the sputter film formation. Further, the insulating layer may be formed by attaching an insulating sheet which is easier to produce.

For example, in the case of using a visible light source including the wavelength conversion element 71 for a display, it is further preferable to reduce a temperature change of the wavelength conversion element 71. If the temperature of a wavelength conversion element being used is 50° C., it is preferable to keep it at 50° C. even during a standby period. In this case, it is preferable to collectively cover the wavelength conversion element 71, the insulating material 72 and the heater 73 by a heat insulating material 74 to reduce power during the standby period.

If the standby period is longer than a use period, it is preferable to approximate the temperature of the wavelength conversion element 71 being used to ambient temperature. In other words, an apparatus used in a room with an average temperature of about 25° C. has the temperature thereof adjusted to 25° C. during a standby period and is used while being cooled to 25° C. even if the interior temperature of the apparatus reaches 50° C. In this way, power consumption during the standby period can be reduced although that during the use period is increased.

In this case, the heater 73 preferably keeps the temperature of the wavelength conversion element 71 during the standby period constant in a range of 10° C. or higher and 30° C. or lower approximate to room temperature. This enables a reduction of the power consumption during the standby period.

In the case of use for a display, a difference between the temperature during the standby period and that during the use period is preferably 50° C. or lower. With this, 1000 or more ON/OFF operations are thought to be borne. The difference between the temperature during the standby period and that during the use period is more preferably 30° C. or lower. With this, 10000 or more ON/OFF operations are thought to be borne.

In addition to being used in image displays for projecting an image onto a screen, wavelength converters can also be used in image displays for projecting an image onto a screen from behind (rear projection displays), backlights of general liquid crystal display devices and the like. Also in these image displays, color reproducibility can also be improved.

The wavelength conversion element 71 of this embodiment can reduce the beam deterioration caused by the thermal lens produced in the case of generating green light and can generate a high-quality laser beam necessary for the scanning type laser projector. Further, in the wavelength conversion element 71 of this embodiment, output instability caused by light absorption can be reduced and light with a stable output required for the display can be generated.

The wavelength conversion element 71 of this embodiment can also reduce crystal destruction caused by light absorption, can suppress crystal destruction occurring during the start-up where largest load acts on the crystal, and can be said to be a wavelength conversion element suitable for a display with a high ON/OFF switching frequency.

A wavelength range of green light used for two-dimensional image display is preferably 488 nm to 550 nm and more preferably 500 nm to 540 nm. In the case of use as a light source of a rear projection display and in the case of use as a backlight of a liquid crystal display device, a light source output needs to be increased to increase a viewing angle. In this case, red, blue and green laser light sources respectively having an output of 2.5 W or higher, preferably 3 W or higher are necessary.

The wavelength conversion element is preferably formed with a periodical polarization reversal structure having a period of 10μ or shorter. This enables visible light necessary for a display using a laser light source to be efficiently obtained.

Fifth Embodiment

Figure 17:
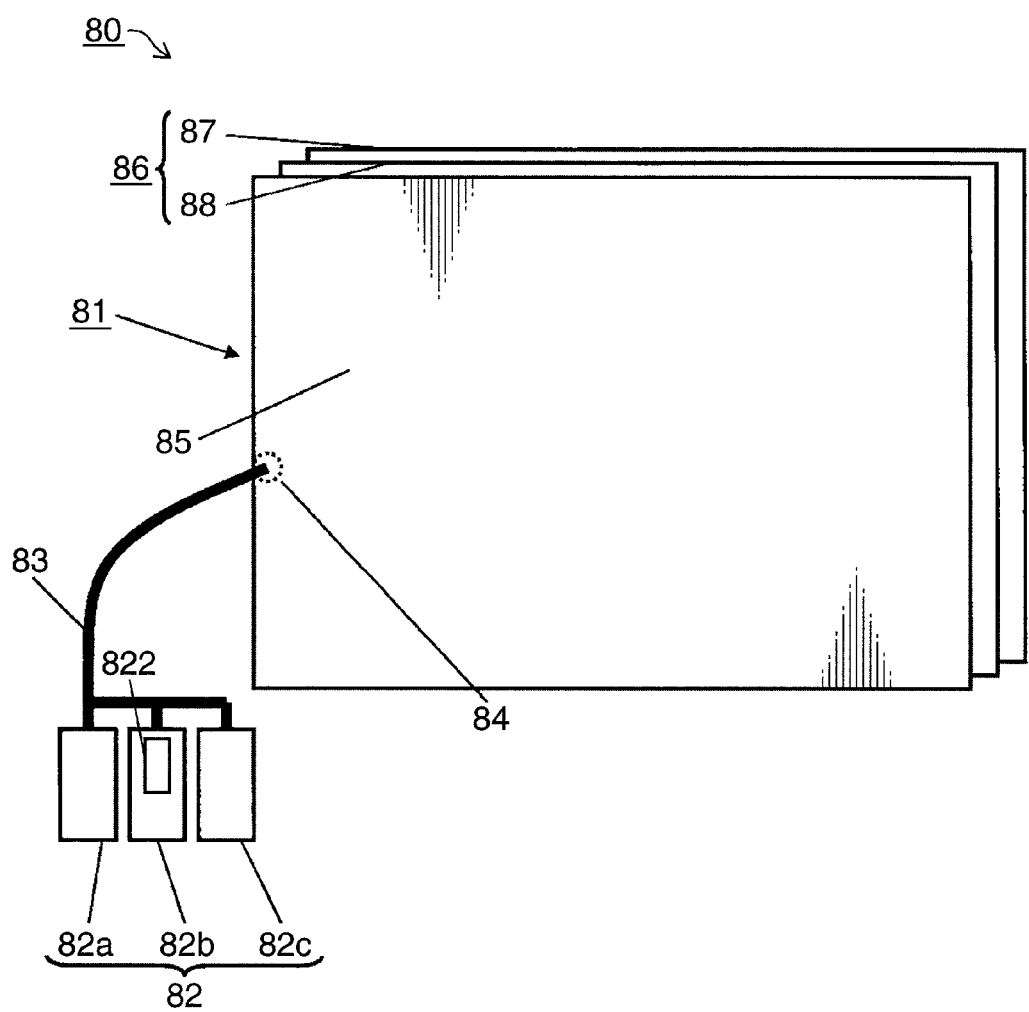
FIG. 17 is a diagram showing the construction of an image display according to a fifth embodiment of the invention.

FIG. 17 is a diagram showing the construction of an image display according to a fifth embodiment employing a backlight illumination device including the wavelength converter shown in any one of the first to third embodiments. FIG. 17 is a schematic construction diagram of a liquid crystal display device 80 as an example of such an image display.

The liquid crystal display device 80 shown in FIG. 17 is provided with a liquid crystal display panel 86 and a backlight illumination device 81 for illuminating the liquid crystal display panel 86 from behind. The backlight illumination device 81 includes a plurality of laser light sources 82 which include laser light sources for emitting at least red, green and blue light. In other words, the plurality of laser light sources 82 include a red laser light source 82a for emitting red laser light, a green laser light source 82b for emitting green laser light and a blue laser light source 82c for emitting blue laser light.

A semiconductor laser composed of an AlGaInP/GaAs material for emitting red light having a wavelength of 640 nm is used as the red laser light source 82a, and a semiconductor laser composed of a GaN material for emitting blue light having a wavelength of 450 nm is used as the blue laser light source 82c. The green laser light source 82b includes a wavelength converter 822 for converting infrared light into green light and emits green light having a wavelength of 530 nm. The wavelength converter 822 is the wavelength converter shown in any one of the above first to third embodiments.

Next, the construction of the liquid crystal display device 80 of the fifth embodiment is further described. The liquid crystal display panel 86 is comprised of a polarizing plate 87 for displaying an image utilizing the respective laser light, i.e. the red, green and blue light emitted from the backlight illumination device 81, and a liquid crystal plate 88. The backlight illumination device 81 of the fifth embodiment shown in FIG. 16 is provided with the plurality of laser light sources 82, an optical fiber 83 for collectively introducing the red, green and blue laser light from the plurality of laser light sources 82 to a light guide plate 85 via a light guiding portion 84, and the light guide plate 85 for emitting laser light from a principle surface (not shown) uniformly illuminated with the red, green and blue light introduced from the light guiding portion 84.

By using the wavelength converter shown in any one of the first to third embodiments of the present invention as the laser light source of the backlight illumination device 81 in the liquid crystal display device 80 of the fifth embodiment in this way, optical damage can be suppressed and the absorption of visible light by ultraviolet light can be reduced.

Sixth Embodiment

Figure 18:
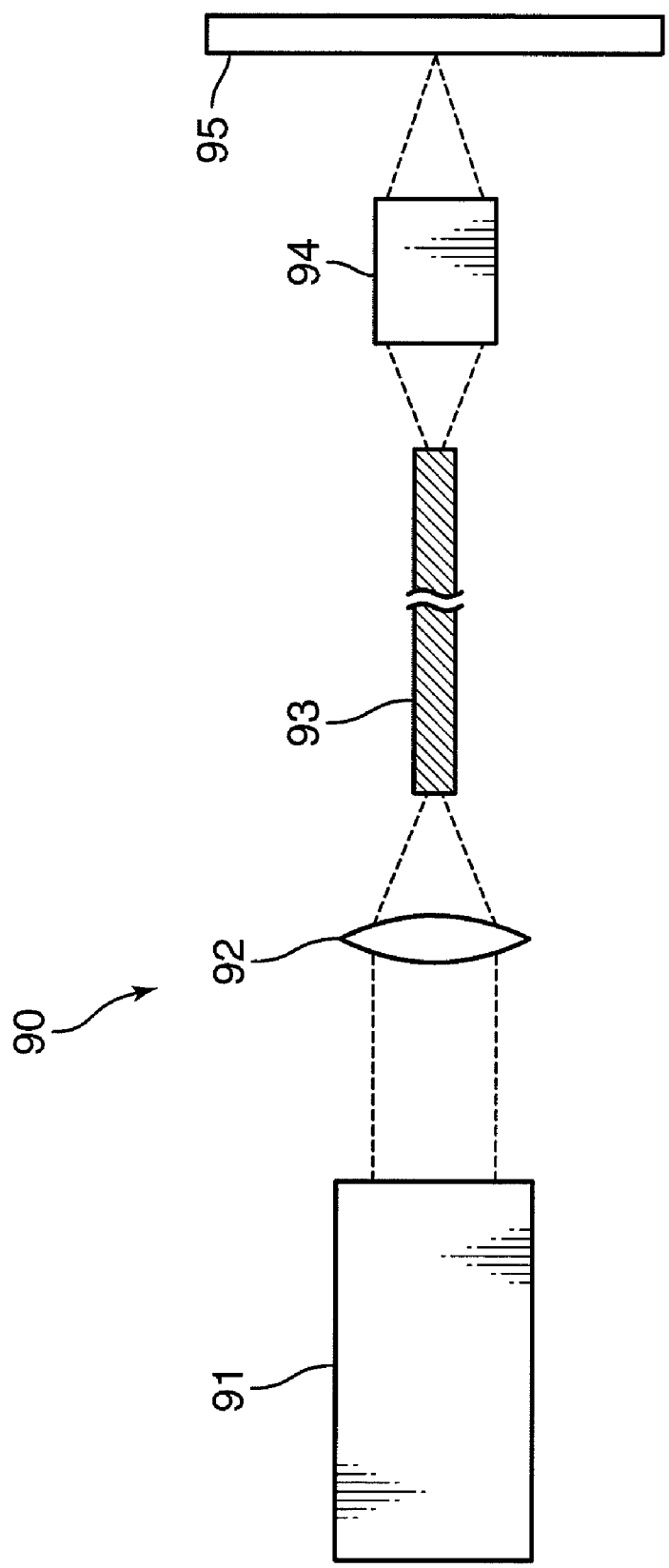
FIG. 18 is a diagram showing the construction of a laser machining apparatus according to a sixth embodiment of the invention.

The wavelength conversion elements of the above first to third embodiments exhibit larger effects by being used in machining apparatuses for machining an object by irradiating laser light. FIG. 18 is a diagram showing the construction of a laser machining apparatus according to a sixth embodiment of the present invention. The laser machining apparatus 90 shown in FIG. 18 is provided with a laser light source 91, a condenser lens 92, an optical fiber 93 and a machining head 94.

The wavelength conversion element shown in any of the above first to third embodiments is used as the laser light source 91. The condenser lens 92 condenses laser light emitted from the laser light source 91 on an incident surface of the flexible optical fiber 93. The optical fiber 93 is a multi-mode optical fiber with a large core diameter and transmits the laser light to the vicinity of an object to be machined 95. The core diameter of the optical fiber 93 is set in conformity with the beam quality of the laser light output from the laser light source 91. The machining head 94 includes a plurality of optical lenses and condenses the laser light as a small circular spot on the object to be machined 95.

By using the wavelength conversion element shown in any one of the first to third embodiments of the present invention as the laser light source in the laser machining apparatus 90 of the sixth embodiment in this way, optical damage can be suppressed and the absorption of visible light by ultraviolet light can be reduced.

For machining application, high-peak infrared light with a duty ratio of pulse oscillation of 2% or lower and a high peak intensity exceeding 1 kW is caused to be incident. Thus, the light intensity of generated green light is also high and the amount of generated ultraviolet light increases, wherefore green light absorption attributed to ultraviolet light also particularly increases. Hence, a thermal lens effect created at the time of a wavelength conversion and beam deterioration resulting from the thermal lens effect are larger than in the case of continuous wave oscillation.

In the case of wavelength-converting such a narrow pulse laser beam with a pulse width of 100 ns or shorter as to be used for machining application, the lens power of the created thermal lens effect gradually increases from a pulse rise to a pulse fall. This means that a condensed position gradually changes from the front half to the rear half of the pulse laser beam.

Since it is required to condense the beam into a small spot on a surface of an object to be machined for machining application, the change of the condensed position between the front half and the rear half of the pulse laser beam is a fatal problem in machining performance. In this embodiment, a laser light source with high machining performance can be realized by being used for machining application to suppress green light absorption attributed to ultraviolet light that increases in quantity as the light intensity increases.

The above specific embodiments mainly embrace inventions having the following constructions.

A wavelength converter according to one aspect of the present invention comprises a fundamental wave light source for emitting a fundamental wave having a wavelength of 2000 nm or shorter; a wavelength conversion element composed of a nonlinear optical crystal having a periodical polarization reversal structure and adapted to convert a fundamental wave emitted from the fundamental wave light source into a harmonic wave; and a heating unit for heating the wavelength conversion element, wherein the period of the polarization reversal structure is so designed that a quasi phase matching temperature of the fundamental wave and the harmonic wave is 40° C. or higher, the heating unit heats the wavelength conversion element to a temperature at which the quasi phase matching is established, and the nonlinear optical crystal contains a lithium niobate or lithium tantalate including at least any one of additives Mg, In, Zn and Sc as a main component.

According to this construction, in the nonlinear optical crystal containing the lithium niobate or lithium tantalate including at least any one of the additives Mg, In, Zn and Sc as the main component, the periodical polarization reversal structure is formed and a wavelength conversion is carried out with the nonlinear optical crystal heated to 40° C. or higher. Thus, optical damage can be suppressed and visible light absorption attributed to ultraviolet light can be reduced.

In the above wavelength converter, it is preferable that the nonlinear optical crystal is a lithium niobate added with MgO in a molar concentration of 5.0 mol % or more; and that the heating unit heats the nonlinear optical crystal to 80° C. or higher.

According to this construction, visible light absorption attributed to ultraviolet light can be reduced and high-output short-wavelength light can be stably output by carrying out a wavelength conversion while establishing a phase matching condition at a high temperature of 80° C. or higher for the lithium niobate added with MgO in the molar concentration of 5.0 mol % or more.

In the above wavelength converter, the nonlinear optical crystal is preferably a lithium niobate added with MgO in a molar concentration of 4.8 mol % or more and below 5.0 mol %.

According to this construction, it was revealed that a crystal temperature at which light absorption was reduced was suddenly reduced and resistance improved from about 40° C. by slightly reducing the added amount of Mg and adding MgO in the molar concentration of 4.8 mol % or more and below 5.0 mol %. An output becomes unstable due to optical damage if the molar concentration is below 4.8 mol %. Thus, in order to stably utilize the wavelength converter at a high output, MgO is added in the molar concentration of 4.8 mol % or more and below 5.0 mol % to establish the phase matching condition at a temperature of 40° C. or higher, whereby high-output short-wavelength light can be stably output.

In the above wavelength converter, the nonlinear optical crystal is preferably a lithium niobate added with $Sc_2O_3$ in a molar concentration of 1.2 mol % or more.

According to this construction, the suppression of optical damage and the reduction of light absorption can be simultaneously realized by establishing the phase matching condition at a temperature of 40° C. or higher in the lithium niobate added with $Sc_2O_3$ in the molar concentration of 1.2 mol % or more. Further, since a high-output characteristic can be maintained in a wide range of an added amount as compared with the case of adding Mg, the added amount can be more easily controlled and crystal production cost can be reduced. Since the Sc-added crystal is excellent in high-output resistance even at low temperatures, it can be used at 80° C. or lower. If the phase matching condition is established at 80° C. or lower, a temperature tolerance within which the phase matching condition is established by the temperature dependency of refractive index dispersion can be enlarged by about 10% as compared with the case where the phase matching condition is established at 100° C. or higher. Thus, a characteristic more stable against a temperature variation can be realized.

In the above wavelength converter, it is preferable that the nonlinear optical crystal contains a lithium niobate as a main component and includes any one of additives Mg, In and Zn, as well as Sc and that a total molar concentration of the additives is below 5.0 mol %.

According to this construction, a boundary molar concentration of the additives necessary to suppress optical damage and that of the additives at which light absorption occurs were presumed by an experiment to lie in a region of about 5.0 mol % in the case of adding Sc, Mg, Zn or In to the lithium niobate or lithium tantalate.

Specifically, the amount of the additives necessary to improve optical damage resistance needs to be more than the vicinity of 5.0 mol %, and that of the additives needs to be less than about 5.0 mol % to realize a light absorption reduction at low temperatures. In the case of Mg, a region where the both conditions are satisfied lay between 4.8 and 5.0 mol %. On the other hand, Sc is a trivalent ion and can reduce optical damage with about half the amount of other additives. Thus, in the case of Sc, a region where the suppression of optical damage and the reduction of light absorption are satisfied lies between 2.4 and 5.0 mol %. Thus, by mixing Sc with any one of the additives Mg, Zn and In, a total molar concentration of the additives for reducing optical damage can be set at 5.0 mol % or less and the reduction of light absorption can be easily realized.

Since Sc is expensive, crystal cost can be reduced by the use of Sc mixed with another additive. Since the molar concentration of Mg can be reduced by mixing a tiny amount of Sc with the additive such as Mg, the amount of the additives contained in the crystal can be reduced and crystallinity can be improved.

In the above wavelength converter, the wavelength conversion element preferably includes a first wavelength conversion element composed of a lithium niobate and a second wavelength conversion element different from the first wavelength conversion element in at least one of a substance added to the lithium niobate, a molar concentration of an additive, a phase matching temperature and an element length.

According to this construction, a fundamental wave emitted from the first wavelength conversion element composed of the lithium niobate is incident on the second wavelength conversion element different from the first wavelength conversion element in at least one of the substance added to the lithium niobate, the molar concentration of the additive, the phase matching temperature and the element length. A harmonic wave converted by the first wavelength conversion element and that converted by the second wavelength conversion element are output.

Accordingly, even in the case of a wavelength conversion by the second wavelength conversion element, it is possible to substantially conform conversion efficiency to theoretical efficiency, suppress beam quality deterioration and stably output high-output short-wavelength light.

In the above wavelength converter, it is preferable that the wavelength conversion element includes a first wavelength conversion element composed of a lithium niobate and a second wavelength conversion element different from the first wavelength conversion element; that the first wavelength conversion element emits both the fundamental wave and a harmonic wave converted from the fundamental wave to the second wavelength conversion element; and that the second wavelength conversion element generates a sum frequency of the fundamental wave and the harmonic wave.

According to this construction, the fundamental wave having passed through the first wavelength conversion element and the harmonic wave converted by the first wavelength conversion element are both incident on the second wavelength conversion element. Then, the sum frequency of the fundamental wave and the harmonic wave is generated by the second wavelength conversion element. Thus, the sum frequency of the fundamental wave and the harmonic wave incident from the first wavelength conversion element can be generated.

In the above wavelength converter, a ratio of polarization reversal portions to the entire element in a fundamental wave passing part in the wavelength conversion element is preferably 45% or higher and 55% or lower.

According to this construction, the generation of the sum frequency of the fundamental wave and the harmonic wave can be suppressed by designing the wavelength conversion element such that the ratio of the polarization reversal portions to the entire element in the fundamental wave passing part in the wavelength conversion element is 45% or higher and than 55% or lower.

In the above wavelength converter, a cross-sectional area of the wavelength conversion element is preferably 2 $mm^2$ or smaller. According to this construction, the temperature of the wavelength conversion element can suddenly rise during the start-up by designing the wavelength conversion element to have the cross-sectional area of 2 $mm^2$ or smaller.

The above wavelength converter preferably further comprises an insulating material held in contact with at least a +Z surface and a −Z surface of the wavelength conversion element. According to this construction, since the insulating material is held in contact with at least the +Z surface and the −Z surface of the wavelength conversion element, a light absorption rate increase in the wavelength conversion element can be suppressed even there is a temperature change.

In the above wavelength converter, an electrical resistivity of the insulating material is preferably $1 \times 10^8$ Ω·cm or higher. According to this construction, by setting the electrical resistivity of the insulating material at $1 \times 10^8$ Ω·cm or higher, the light absorption rate increase can be suppressed also in the case where the wavelength converter is used for display application in which the temperature of the wavelength conversion element is frequently changed.

In the above wavelength converter, no DC drift preferably occurs in the insulating material. According to this construction, the light absorption rate increase can be suppressed since no DC drift occurs in the insulating material.

In the above wavelength converter, the insulating material is preferably an insulating layer formed by a CVD method. According to this construction, by forming the insulating material by the insulating layer formed by the CVD method, the occurrence of a DC drift can be suppressed.

In the above wavelength converter, the heating unit preferably maintains the temperature of the wavelength conversion element constant in a range of 10° C. or higher and 30° C. or lower during a standby period. According to this construction, power consumption during the standby period can be suppressed since the temperature of the wavelength conversion element during the standby period is maintained constant in the range of 10° C. or higher and 30° C. or lower close to room temperature.

The above wavelength converter preferably further comprises a heat insulating material for covering peripheral parts of the wavelength conversion element and the heating unit; a measuring unit for measuring an output of the harmonic wave; and a controller for controlling the amount of a current input to the fundamental wave light source so that the output of the harmonic wave measured by the measuring unit is constant.

According to this construction, power consumption at the time of heating the wavelength conversion element can be suppressed since the peripheral parts of the wavelength conversion element and the heating unit are covered by the heat insulating material. Further, the output of the harmonic wave is measured by the measuring unit and the amount of the current input to the fundamental wave light source is so controlled by the controller that the output of the harmonic wave measured by the measuring unit is constant. Thus, the output of the harmonic wave can be stabilized.

In the above wavelength converter, it is preferable that the fundamental wave light source emits a fundamental wave having a wavelength of 800 nm to 1200 nm, that the wavelength conversion element converts the fundamental wave into a second harmonic wave, and that the wavelength converter further comprises a first anti-reflection film provided on a light incident surface of the wavelength conversion element for preventing the reflection of the fundamental wave and a second anti-reflection film provided on a light emergent surface of the wavelength conversion element for preventing the reflection of the second harmonic wave and a third harmonic wave.

According to this construction, the fundamental wave having the wavelength of 800 nm to 1200 nm is emitted from the fundamental wave light source and converted into the second harmonic wave by the wavelength conversion element. The reflection of the fundamental wave is prevented by the first anti-reflection film provided on the light incident surface of the wavelength conversion element, and the reflection of the second and third harmonic waves is prevented by the second anti-reflection film provided on the light emergent surface of the wavelength conversion element.

In the above wavelength converter, it is preferable that the fundamental wave light source emits a fundamental wave having a wavelength of 400 nm to 800 nm, that the wavelength conversion element converts the fundamental wave into a second harmonic wave, and that the wavelength converter further comprises a first anti-reflection film provided on a light incident surface of the wavelength conversion element for preventing the reflection of the fundamental wave and a second anti-reflection film provided on a light emergent surface of the wavelength conversion element for preventing the reflection of the fundamental wave and the second harmonic wave.

According to this construction, the fundamental wave having the wavelength of 400 nm to 800 nm is emitted from the fundamental wave light source and converted into the second harmonic wave by the wavelength conversion element. The reflection of the fundamental wave is prevented by the first anti-reflection film provided on the light incident surface of the wavelength conversion element, and the reflection of the fundamental wave and the second harmonic wave is prevented by the second anti-reflection film provided on the light emergent surface of the wavelength conversion element.

Thus, a transmission loss of the fundamental wave in the light incident surface of the wavelength conversion element is reduced, thereby enabling a more efficient wavelength conversion. Further, it becomes possible to reduce a transmission loss of the second harmonic wave in the light emergent surface of the wavelength conversion element and reduce the light intensities of the fundamental wave and the second harmonic wave in the element.

Thus, a transmission loss of the fundamental wave in the light incident surface of the wavelength conversion element is reduced, thereby enabling a more efficient wavelength conversion. Further, it becomes possible to reduce a transmission loss of the second harmonic wave in the light emergent surface of the wavelength conversion element and reduce the light intensities of the second and third harmonic waves in the element.

In the above wavelength converter, it is preferable that the fundamental wave light source includes a pump laser and a laser medium, that a pair of resonator mirrors are further provided, that the laser medium and the wavelength conversion element are arranged between the pair of resonator mirrors, that the laser medium is excited by the pump laser to generate the fundamental wave, and that the fundamental wave is wavelength-converted by the wavelength conversion element between the pair of resonator mirrors.

According to this construction, since laser light is resonated by the pair of resonator mirrors, it is possible to improve conversion efficiency from a fundamental wave into a harmonic wave, shorten the length of the wavelength conversion element and realize the miniaturization of the wavelength converter.

In the above wavelength converter, light intensity in the wavelength conversion element preferably exceeds 360 W/mm$^2$ According to this construction, conversion efficiency from a fundamental wave into a harmonic wave can be improved by setting the light intensity in the wavelength conversion element to be higher than 360 W/mm$^2$.

In the above wavelength converter, the fundamental wave light source preferably emits a pulse-oscillated fundamental wave to the wavelength conversion element. According to this construction, light intensity in the element can be increased and conversion efficiency from the fundamental wave into a harmonic wave can be improved since the pulse-oscillated fundamental wave is emitted to the wavelength conversion element.

In the above wavelength converter, a duty ratio of the fundamental wave pulse-oscillated from the fundamental wave light source is preferably 50% or lower. According to this construction, conversion efficiency from the fundamental wave into a harmonic wave can be improved by setting the duty ratio of the pulse-oscillated fundamental wave to be 50% or lower.

In the above wavelength converter, it is preferable that the nonlinear optical crystal contains a lithium niobate as a main component and includes at least two of additives Sc, Mg, In and Zn, that a total molar concentration of the additives is below 5.0 mol % and that the heating unit heats the nonlinear optical crystal to 80° C. or lower.

According to this construction, the nonlinear optical crystal containing the lithium niobate as the main component includes at least two of the additives Sc, Mg, In and Zn. The nonlinear optical crystal is so designed that the total molar concentration of at least two of the additives Sc, Mg, In and Zn is below 5.0 mol %, and is heated to 80° C. or lower. In this case, it is possible to suppress optical damage and reduce light absorption.

In the above wavelength converter, it is preferable that the nonlinear optical crystal contains a lithium niobate as a main component and includes at least any one of additives Mg, In and Zn as well as Sc, that the sum of twice the molar concentration of Sc and a molar concentration of at least any one of the additives Mg, In and Zn is 4.8 mol % or more and that the heating unit heats the nonlinear optical crystal to 80° C. or lower.

According to this construction, the nonlinear optical crystal containing the lithium niobate as the main component includes at least any one of the additives Mg, In and Zn as well as Sc. The nonlinear optical crystal is so designed that the sum of twice the molar concentration of Sc and the molar concentration of at least any one of the additives Mg, In and Zn is 4.8 mol % or more, and is heated to 80° C. or lower. In this case, it is possible to suppress optical damage and reduce light absorption.

In the above wavelength converter, a [Li/(Li+Nb)] ratio of a lithium niobate crystal is preferably 0.484 to 0.500. According to this construction, a wavelength conversion at a low temperature is possible since optical damage can be reduced by adding, for example, 4.5 mol % or more of Mg to the lithium niobate crystal having the [Li/(Li+Nb)] ratio of 0.484 to 0.500.

An image display according to another aspect of the present invention comprises the above wavelength converter for converting a fundamental wave into a harmonic wave; a screen; and an optical system for forming an image on the screen using laser light converted into the harmonic wave by the wavelength converter.

According to this construction, a periodical polarization reversal structure is formed in a nonlinear optical crystal containing a lithium niobate or lithium tantalate including at least any one of additives Mg, In, Zn and Sc as a main component, and a wavelength conversion is carried out with the nonlinear optical crystal heated to 40° C. or higher. Thus, an image display can be provided which can suppress optical damage and reduce visible light absorption attributed to ultraviolet light.

An image display according to still another aspect of the present invention comprises a liquid crystal display panel; and the above wavelength converter for converting a fundamental wave into a harmonic wave and illuminating the liquid crystal display panel from behind.

According to this construction, a periodical polarization reversal structure is formed in a nonlinear optical crystal containing a lithium niobate or lithium tantalate including at least any one of the additives Mg, In, Zn and Sc as the main component, and a wavelength conversion is carried out with the nonlinear optical crystal heated to 40° C. or higher. Thus, an image display can be provided which can suppress optical damage and reduce visible light absorption attributed to ultraviolet light.

A machining apparatus according to still another aspect of the present invention comprises the above wavelength converter for converting a fundamental wave into a harmonic wave; and a machining head for condensing laser light output from the wavelength converter on an object to be machined.

According to this construction, a periodical polarization reversal structure is formed in a nonlinear optical crystal containing a lithium niobate or lithium tantalate including at least any one of the additives Mg, In, Zn and Sc, and a wavelength conversion is carried out with the nonlinear optical crystal heated to 40° C. or higher. Thus, a machining apparatus can be provided which can suppress optical damage and reduce visible light absorption attributed to ultraviolet light.

INDUSTRIAL APPLICABILITY

A wavelength converter, an image display and a machining apparatus according to the present invention can obtain a high-output harmonic wave with high efficiency from a nonlinear optical crystal having a polarization reversal structure. In the case of outputting green light as a second harmonic wave, a green light source can be miniaturized and is usefully applied to a backlight of a liquid crystal television, a projection television, a projector and the like that requires a compact and high-output light source.

What is claimed is:

1. A wavelength converter, comprising:
    a fundamental wave light source for emitting a fundamental wave having a wavelength of 2000 nm or shorter;
    a wavelength conversion element composed of a nonlinear optical crystal having a periodical polarization reversal structure and adapted to convert a fundamental wave emitted from the fundamental wave light source into a harmonic wave; and
    a heating unit for heating the wavelength conversion element,
    wherein:
    the period of the polarization reversal structure is so designed that a quasi phase matching temperature of the fundamental wave and the harmonic wave is 40° C. or higher and 80° C. or lower,
    the heating unit heats the wavelength conversion element to a temperature at which the quasi phase matching is established, and
    the nonlinear optical crystal is composed of a lithium niobate containing MgO in a molar concentration of 4.2 mol % or more and 4.7 mol % or less and $Sc_2O_3$ in a molar concentration of 0.3 mol % or more and 0.9 mol % or less.

2. A wavelength converter according to claim 1, wherein:
    the nonlinear optical crystal contains a lithium niobate as a main component and includes at least any one of additives Mg, In and Zn as well as Sc, and
    a total molar concentration of the additives is below 5.0 mol %.

3. A wavelength converter according to claim 1, wherein the wavelength conversion element includes:
    a first wavelength conversion element composed of a lithium niobate, and
    a second wavelength conversion element different from the first wavelength conversion element in at least one of a substance added to the lithium niobate, a molar concentration of an additive, a phase matching temperature and an element length.

4. A wavelength converter according to claim 1, wherein:
    the wavelength conversion element includes a first wavelength conversion element composed of a lithium niobate and a second wavelength conversion element different from the first wavelength conversion element,
    the first wavelength conversion element emits both the fundamental wave and a harmonic wave converted from the fundamental wave to the second wavelength conversion element, and
    the second wavelength conversion element generates a sum frequency of the fundamental wave and the harmonic wave.

5. A wavelength converter according to claim 1, wherein a ratio of polarization reversal portions to the entire element in a fundamental wave passing part in the wavelength conversion element is 45% or higher and 55% or lower.

6. A wavelength converter according to claim 1, wherein a cross-sectional area of the wavelength conversion element is 2 $mm^2$ or smaller.

7. A wavelength converter according to claim 1, further comprising an insulating material held in contact with at least a +Z surface and a −Z surface of the wavelength conversion element.

8. A wavelength converter according to claim 7, wherein an electrical resistivity of the insulating material is $1 \times 10^8$ Ω·cm or higher.

9. A wavelength converter according to claim 8, wherein no DC drifts occurs in the insulating material.

10. A wavelength converter according to claim 7, wherein the insulating material is an insulating layer formed by a CVD method.

11. A wavelength converter according to claim 1, wherein the heating unit maintains the temperature of the wavelength conversion element constant in a range of 10° C. or higher and 30° C. or lower during a standby period.

12. A wavelength converter according to claim 1, further comprising:
    a heat insulating material for covering peripheral parts of the wavelength conversion element and the heating unit;
    a measuring unit for measuring an output of the harmonic wave; and
    a controller for controlling the amount of a current input to the fundamental wave light source so that the output of the harmonic wave measured by the measuring unit is constant.

13. A wavelength converter according to claim 1, wherein:
    the fundamental wave light source emits a fundamental wave having a wavelength of 800 nm to 1200 nm,
    the wavelength conversion element converts the fundamental wave into a second harmonic wave, and
    the wavelength converter further comprises:
    a first anti-reflection film provided on a light incident surface of the wavelength conversion element for preventing the reflection of the fundamental wave, and
    a second anti-reflection film provided on a light emergent surface of the wavelength conversion element for preventing the reflection of the second harmonic wave and a third harmonic wave.

14. A wavelength converter according to claim 1, wherein:
    the fundamental wave light source emits a fundamental wave having a wavelength of 400 nm to 800 nm,
    the wavelength conversion element converts the fundamental wave into a second harmonic wave, and
    the wavelength converter further comprises:
    a first anti-reflection film provided on a light incident surface of the wavelength conversion element for preventing the reflection of the fundamental wave and
    a second anti-reflection film provided on a light emergent surface of the wavelength conversion element for preventing the reflection of the fundamental wave and the second harmonic wave.

15. A wavelength converter according to claim 1, wherein:
the fundamental wave light source includes a pump laser and a laser medium,
the wavelength converter further comprises a pair of resonator mirrors,
the laser medium and the wavelength conversion element are arranged between the pair of resonator mirrors,
the laser medium is excited by the pump laser to generate the fundamental wave, and
the fundamental wave is wavelength-converted by the wavelength conversion element between the pair of resonator mirrors.

16. A wavelength converter according to claim 1, wherein light intensity in the wavelength conversion element exceeds 360 W/mm$^2$.

17. A wavelength converter according to claim 1, wherein the fundamental wave light source emits a pulse-oscillated fundamental wave to the wavelength conversion element.

18. A wavelength converter according to claim 17, wherein a duty ratio of the fundamental wave pulse-oscillated from the fundamental wave light source is 50% or lower.

19. A wavelength converter according to claim 1, wherein a [Li/(Li+Nb)] ratio of a lithium niobate crystal is 0.484 to 0.500.

20. An image display, comprising:
a wavelength converter according to claim 1 for converting a fundamental wave into a harmonic wave;
a screen; and
an optical system for forming an image on the screen using laser light converted into the harmonic wave by the wavelength converter.

21. An image display according to claim 20, wherein the wavelength converter generates green light of 3 W or higher having a wavelength of 488 nm to 550 nm.

22. An image display, comprising:
a liquid crystal display panel; and
a wavelength converter according to claim 1 for converting a fundamental wave into a harmonic wave and illuminating the liquid crystal display panel from behind.

23. A machining apparatus, comprising:
a wavelength converter according to claim 1 for converting a fundamental wave into a harmonic wave; and
a machining head for condensing laser light output from the wavelength converter on an object to be machined.

* * * * *